United States Patent [19]

Shobu et al.

[11] Patent Number: 5,012,470
[45] Date of Patent: Apr. 30, 1991

[54] DATA TERMINAL EQUIPMENT AND DATA TRANSMISSION CONTROL METHOD

[75] Inventors: Toshifumi Shobu, Atsugi; Hiroshi Shibata, Zama; Fumihiro Ogasawara, Ebina, all of Japan

[73] Assignee: Ricoh Company, Ltd., Tokyo, Japan

[21] Appl. No.: 404,634

[22] Filed: Sep. 8, 1989

[30] Foreign Application Priority Data

| Sep. 22, 1988 | [JP] | Japan | 63-236360 |
| Oct. 7, 1988 | [JP] | Japan | 63-252113 |
| Feb. 13, 1989 | [JP] | Japan | 1-31235 |
| May 9, 1989 | [JP] | Japan | 1-114134 |

[51] Int. Cl.$^5$ .................. H04J 3/12; H04Q 11/04
[52] U.S. Cl. .................. 370/110.1; 370/61; 370/84; 370/94.1; 370/99
[58] Field of Search .......... 370/110.1, 94.1, 60, 370/58.1, 85.1, 85.9, 85.13, 79, 84, 61, 99; 340/825.03, 825.06, 825.07, 825.5, 825.51, 825.52

[56] References Cited

U.S. PATENT DOCUMENTS

| 4,689,789 | 8/1987 | Herger | 370/110.1 |
| 4,722,082 | 1/1988 | Furuya et al. | 370/110.1 |
| 4,755,992 | 7/1988 | Albal | 370/94.1 |
| 4,792,800 | 12/1988 | Fujioka et al. | 370/110.1 |
| 4,821,265 | 4/1989 | Albal et al. | 370/94.1 |
| 4,835,769 | 5/1989 | Donaghue, Jr. et al. | 370/85.1 |
| 4,847,833 | 7/1989 | Doering et al. | 370/110.1 |

FOREIGN PATENT DOCUMENTS

| 0283295 | 9/1988 | European Pat. Off. . |
| 0331190 | 6/1989 | European Pat. Off. . |
| 0331205 | 6/1989 | European Pat. Off. . |
| 8601660 | 8/1986 | World Int. Prop. O. . |

OTHER PUBLICATIONS

I.E.E.E. International Conference on Communications, '88, Session 47.3; vol. 3, Jun. 12, 1988, Philadelphia, U.S.; pp. 1-6; E. Amada et al.
I.E.E.E. Global Telecommunications Conference Globecom, '85, Session 2.5, vol. 1, Dec. 1, 1986; Houston, U.S.; pp. 1-4; J. Tenckhoff.
AT&T Technical Journal; vol. 65; No. 1, Jan. 1, 1986, New York, U.S.; pp. 19-25; H. Aldermeshian.
Communication et Transmission; vol. 9, No. 3, 1987, Paris, France; pp. 19-34; M. Clost et al.
Dis 8208; pp. 1-124; 1980.
International Standard Iso 7776; 27 pages; 1986.
CCITT Recommendation T.70; pp. 394-426.

*Primary Examiner*—Douglas W. Olms
*Assistant Examiner*—Alpus H. Hsu
*Attorney, Agent, or Firm*—Oblon, Spivak, McClelland, Maier & Neustadt

[57] ABSTRACT

A data terminal equipment which is coupled to an ISDN through an access line and uses a hierarchical protocol in conformity to an OSI reference standard model includes the following structural elements. A first data link protocol circuit provides a link access procedure balanced (LAPB) modulo-8 data link protocol. A second data link protocol circuit provides an LAPB modulo-128 data link protocol. A third data link protocol circuit provides a data link protocol based on a link access procedure for a data channel (LAPD). A protocol determining circuit determines a data link protocol to be used by referring to an address field and a control field of a cell set-up signal which is supplied from a second data terminal equipment. A data link protocol activating circuit selects and activates one of the first, second and third circuits on the basis of the result provided by the protocol determining circuit.

20 Claims, 19 Drawing Sheets

FIG. 11A

| | MODULO 8 | MODULO 128 |
|---|---|---|
| | 8 7 6 5 | 8 7 6 5 |
| GFI | 0 D 0 1 | 0 D 1 0 |

FIG. 11B

| | 8 7 6 5 | | 8 7 6 5 |
|---|---|---|---|
| LCGN "0" = | 0 0 0 0 | ~ "15" = | 1 1 1 1 |

FIG. 11C

| | 8 7 6 5 4 3 2 1 | 8 7 6 5 4 3 2 1 |
|---|---|---|
| LCN "0"= | 0 0 0 0 0 0 0 0 | "255"= 1 1 1 1 1 1 1 1 |

FIG. 11D

| | 8 7 6 5 4 3 2 1 |
|---|---|
| FBh "FB" = | 1 1 1 1 1 1 0 1 |

FIG. IIE

TBR

```
       8 7 6 5 4 3 2 1
OCTET 1 |       L I       |
      2 | 0 1 1 1 0 0 0 0 |
      3 |  DESTINATION REF. |
      4 |    INFORMATION    |
      5 | REASON FOR REJECTION |
      6 |                   |
      N |   PARAMETER FIELD  |
```

FIG. 18

| ONE-TOUCH DIAL NO. | 1 | 2 | 3 | 4 |
|---|---|---|---|---|
| ISDN ADDRESS | 123-456 | 789-012 | 345-6-789 | 012-345-6789 |
| SUB-ADDRESS | 003 | 010 | 001 | NOT-REG CODE |
| EXCHANGE SYSTEM | CS | PS | CS | PS |
| LAYER-3 PROTOCOL | T.70 | X.25 | ISO 8208 | NOT-REG CODE |
| LAYER-3 MODULO SIZE | BLANK | MODULO 8 | MODULO 128 | NOT-REG CODE |
| LAYER-2 PROTOCOL | LAPB | LAPB | LAPD | NOT-REG CODE |
| LAYER-2 MODULO SIZE | MODULO 128 | MODULO 8 | MODULO 128 | NOT-REG CODE |

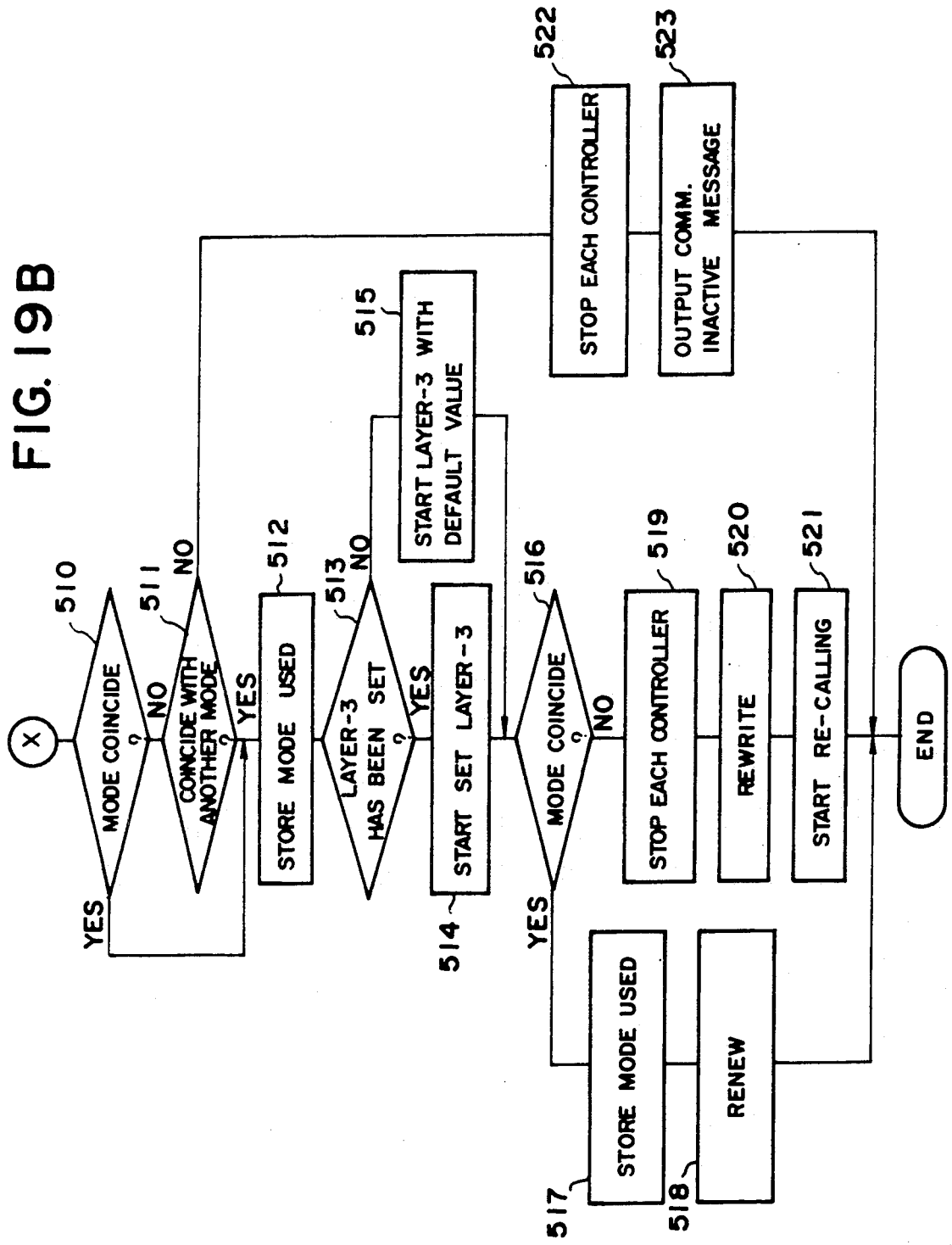

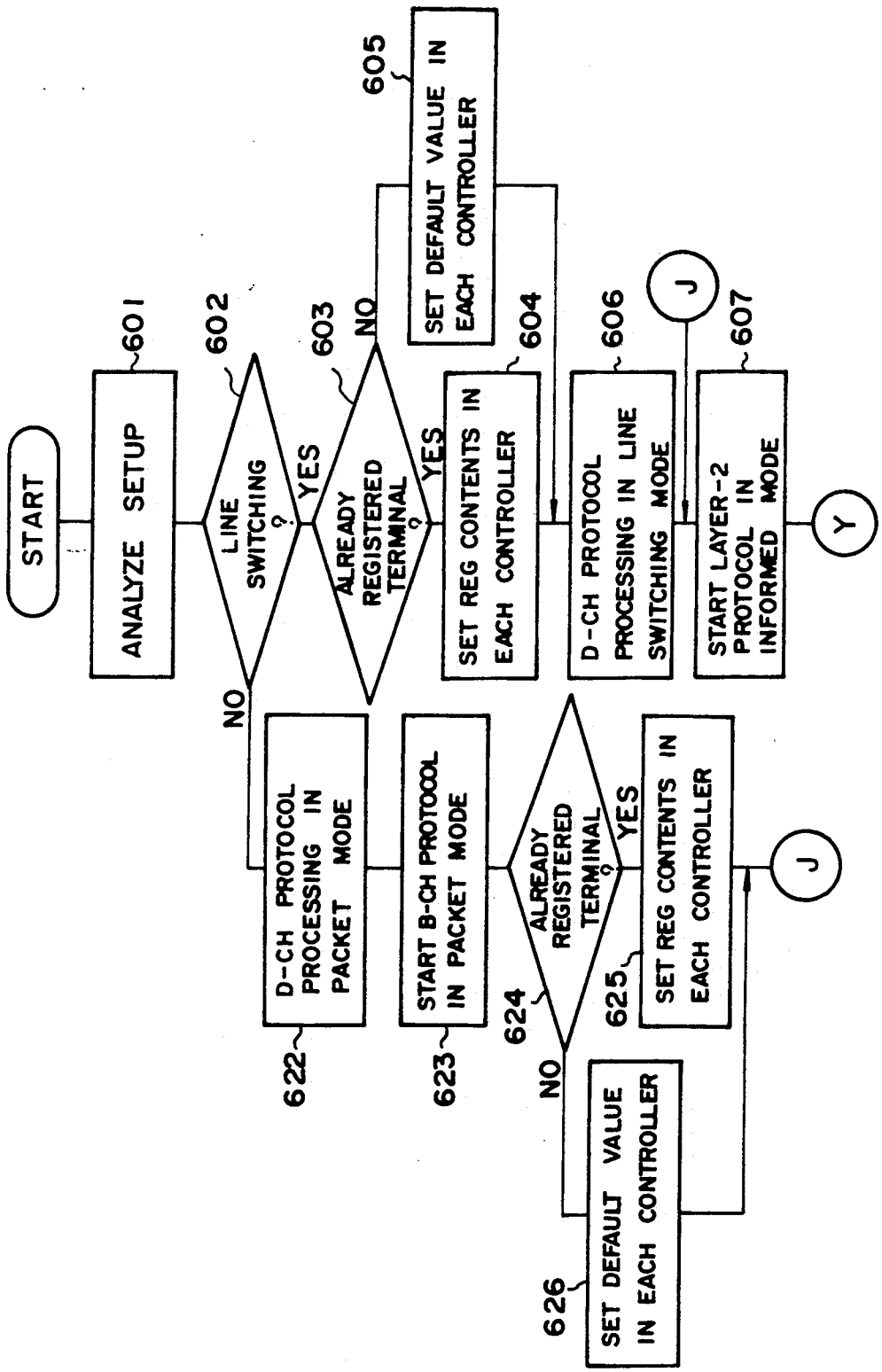

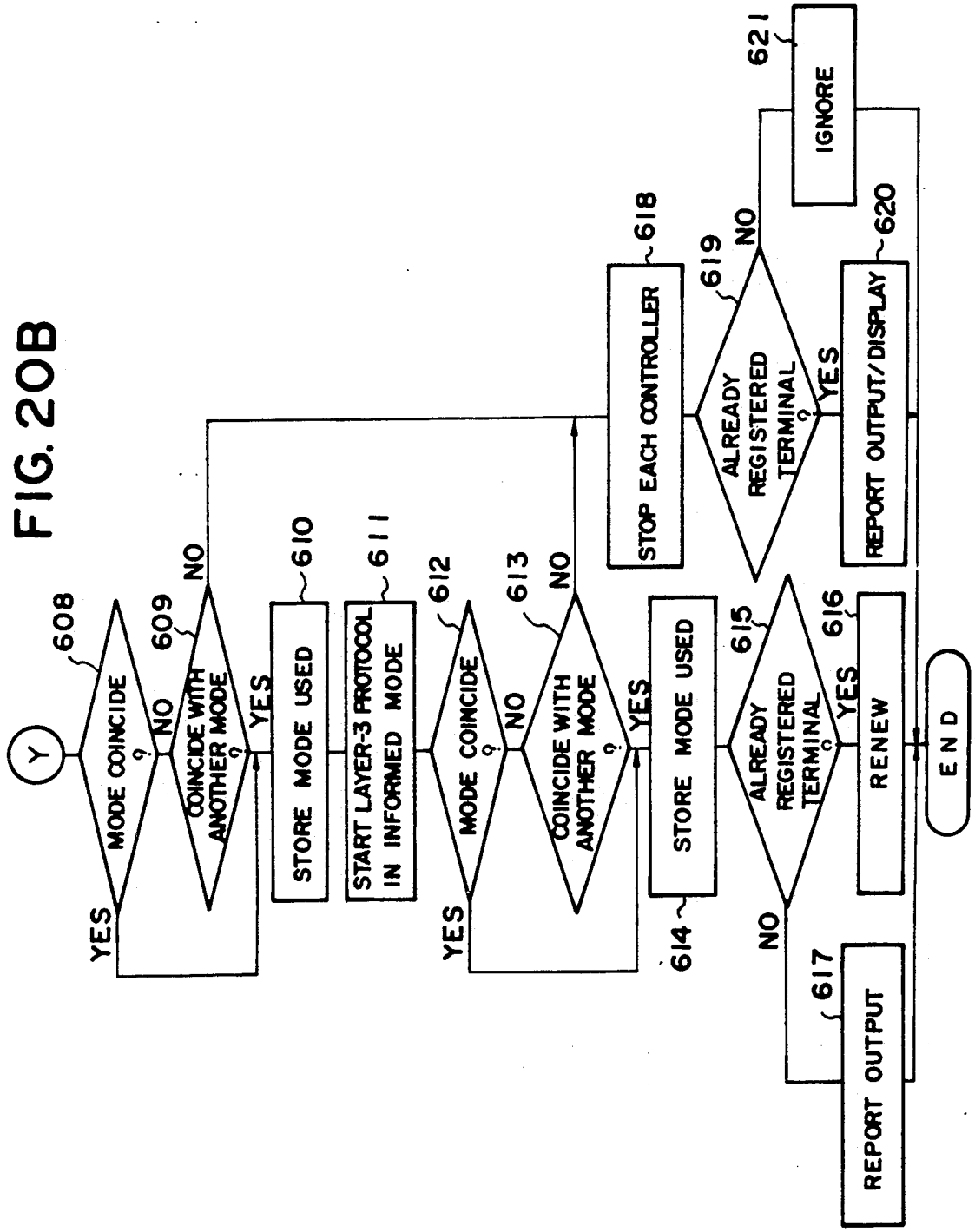

DATA TERMINAL EQUIPMENT AND DATA TRANSMISSION CONTROL METHOD

BACKGROUND OF THE INVENTION

The present invention generally relates to a data terminal equipment, and more particularly to a data terminal equipment which uses a hierarchical protocol based on an OSI standard reference model. The present invention further relates to a data transmission control method suitable for the above-mentioned data terminal equipment.

Recently, there is a trend that a data terminal equipment which uses a digital line as a transmission line uses, as a transmission protocol, a hierarchical protocol based on an OSI (Open Systems Interconnection) standard reference model in order to establish data transmission between devices of different types. The hierarchical protocol consists of first to seventh layers arranged in this order from the lowermost layer. The first layer is a physical layer which controls a physical medium. The second layer is a data link layer that ensures communication up to an adjacency open type system. The third layer is a network layer which ensures communication up to an end open type system. The fourth layer is a transport layer which presents a transparent transmission line. The fifth layer is a session layer which controls conversation. The sixth layer is a presentation layer which unifies information presentation styles. The seventh layer is an application layer which presents system management and protocols for users. The OSI reference model is described in "DATA TRANSMISSION TECHNIQUES FOR PRACTITIONERS", NTT Suzuka Electric and Communication School Data Transmission Working Group, for example.

Conventionally, a high level data link control (HDLC) procedure is widely used as a protocol for the second layer, i.e., the data link layer in the hierarchical protocol. Particularly, when a public digital network is used as a transmission line, link access procedure balanced data link protocols defined in the CCITT recommendation X.21 or X.75 are used as HDLC procedures. Hereinafter, the link access procedure balanced data link protocol is simply referred to as LAPB data link protocol.

The LAPB data link protocol is used for data transmission of point-to-point type. In the LAPB data link protocol, data to be transmitted is arranged to a predetermined frame format, and is transmitted for every frame. A receiver determines whether a data error is contained in data for every frame. When a data error is found, the receiver can request the transmitter to retransmit the frame related to the found data error. Thus, the receiver can obtain data having no data error.

The receiver can put together consecutive frames which have continuously been received and subject the consecutive frames to the error checking procedure. According to the LAPB data link protocol, a maximum number of frames which can continuously be received is limited. A maximum of frames is seven in a standard mode, and 127 in an extended mode. In the following description, an LAPB modulo-8 data link protocol indicates the case where a maximum of frames which can consecutively be received is seven, and an LAPB modulo-128 data link protocol indicates the case where a maximum of frames which can consecutively be received is 127.

On the other hand, recently, integrated services digital networks (hereinafter simply referred to as ISDNs) are being built. In ISDNs, a link access procedure for D-channel is used as a data link protocol for a signal channel (D channel) for performing a line control such as a call setting up procedure. Hereinafter, this link access protocol for D-channel is simply referred to as LAPD data link protocol. The LAPD data link protocol is based on the LAPB data link protocol and is obtained by adding new functions necessary for ISDNs to execute the LAPB data link protocol. The LAPD data link protocol can be applied to D channel, and further will be applied to information channels of ISDNs (B channels) and data link protocols used in the existing public digital networks.

From the above-mentioned viewpoints, there is a possibility that protocols of the three different types, that is, the LAPB modulo-8 data link protocol, the LAPB modulo-128 data link protocol and the LAPD data link protocol may be used together as data link protocols for information channels. In other words, data terminal equipments based on the different data link protocols may be used together.

ISDNs are intended to integrate functions provided by conventional public switched telephone networks (PSTNs), circuit switched public data networks (CSPDN) and packet switched data networks (PSDNs) in the future and will be used in place of those networks. However, it is estimated that it takes long time the conventional networks to be replaced with IDSNs. As a result, ISDNs, PSTNs, CSPDNs and PSDNs by be used together until the replacement is completed.

It is basically necessary for the data terminal equipment itself to have an ISDN-based transmission function in order to be coupled to ISDN. In actuality, it is possible to connect a conventional data terminal equipment to ISDN by use of a terminal adapter which realizes ISDN transmission functions. The terminal adapter realizes a signal control and a packet communication control which use the signal channel (D channel) of ISDN, and low-level layer functions on information channel thereof.

Generally, a data terminal equipment has transmission functions provided by high-level layers, which are used when connected to existing networks. Therefore, even when the data terminal equipment is connected to ISDN through the terminal adapter, the high-level layer transmission functions are used.

As data terminal equipments coupled to digital line networks, there is a facsimile machine or a telematic terminal such as a Japanese teletex device. When a group-4 facsimile machine uses, as a transmission line, CSPDN or PSDN, the transmission function defined in th CCITT recommendation T.70 is used.

On the other hand, according to the CCITT recommendation T.90, the transmission function defined in the ISO standard ISO8208 is a standard function in ISDN's. The CCITT recommendation T.90 sanctions using the CCITT recommendation T.70 transmission function as an optional transmission function.

As described above, there are plural protocols for each layer With respect to a data terminal equipment connected to ISDN. Therefore, it is impossible to perform data transmission between data terminal equipments which have the same terminal function but the different transmission functions. This is inconvenient.

SUMMARY OF THE INVENTION

A general object of the present invention is to provide a novel and useful data terminal equipment in which the aforementioned disadvantages are eliminated.

A more specific object of the present invention is to provide a data terminal equipment capable of communicating with other data terminal equipments based on various different protocols.

The above-mentioned objects of the present invention can be achieved by a data terminal equipment which is coupled to an integrated services digital network (ISDN) through an access line and uses a hierarchical protocol in conformity to an OSI reference standard model, comprising first data link protocol means for providing a link access procedure balanced (LAPB-)modulo-8 data link protocol, second data link protocol means for providing an LAPB modulo-128 data link protocol, and third data link protocol means for providing a data link protocol based on a link access procedure for a data channel (LAPD). The data terminal equipment further comprises protocol determining means for determining a data link protocol to be used by referring to an address field and a control field of a call set-up signal which is supplied from a second data terminal equipment, and data link protocol activating means, coupled to the first, second and third means and the protocol discriminating means, for selecting and activating one of the first, second and third means on the basis of the result provided by the protocol determining means.

The aforementioned objects of the present invention can also be achieved by a data terminal equipment which is coupled to an integrated services digital network (ISDN) through an access line and uses a hierarchical protocol in conformity to an OSI reference standard model, comprising protocol control means for providing a plurality of protocols for each of at least a data link layer (layer 2) and a network layer (layer 3) of the hierarchical protocol, and protocol storage means for storing information on a protocol which is related to each of at least the data link layer and the network layer and which is available in a second data terminal equipment with which the data terminal equipment wants to communicate. The data terminal equipment further comprises protocol learning means for discriminating a transmission procedure in the second data terminal equipment for each of at least the data link layer and the network layer by referring to a procedure signal transferred between the data terminal equipment and the second data terminal equipment at the time of setting up a call and for storing the discriminated transmission procedure in the protocol storage means, and protocol setting means for setting one of the plurality of protocols for each of at least the data link layer and the network layer in the protocol control means by referring to the information stored in the protocol storage means.

Another object of the present invention is to provide a transmission control method for controlling the data terminal equipment.

This object can be achieved by a data transmission control method adapted to a data terminal equipment which uses a hierarchical protocol and has, as a transmission function on an information channel, a first transmission procedure in conformity to the ISO standard ISO8208 and a second transmission procedure in conformity to the CCITT recommendation T.70. The method comprises the steps of receiving a procedure signal related to a network layer (layer 3) supplied from a calling terminal when an information channel related to the network layer is established, the procedure signal having a layer-3 header preceding procedure information on the layer 3, extracting the layer-3 header from the received procedure signal, discriminating a transmission function on the information channel available in the calling terminal by referring to the extracted layer-3 header, and selecting one of the first and second transmission procedures from the discrimination result.

The aforementioned objects of the present invention can also be achieved by a data transmission control method adapted to a data terminal equipment which uses a hierarchical protocol and has, as a transmission function on an information channel, a first transmission procedure in conformity to the ISO standard ISO8208 and a second transmission procedure in conformity to the CCITT recommendation T.70, wherein the data terminal equipment further has a memory which registers information on a transmission function available in each of other terminals. The method comprises the steps of determining whether information on a destination terminal with which the data terminal equipment serving as a calling terminal wants to communicate has been registered in the memory, reading out the information related to the destination terminal stored in the memory when it is found that information on the destination terminal has been registered, determining whether the read-out information shows the first transmission procedure in conformity to the ISO standard ISO8208 or the second transmission procedure in conformity to the CCITT recommendation T.70, selecting one of the first and second transmission procedures so as to coincide with that of the destination terminal on the basis of the determined result, and setting up a call to the destination terminal on the basis of the selected one of the first and second transmission procedures.

Additional objects, features and advantages of the present invention will become apparent form the following detailed description when read in conjunction with the accompanying drawings.

BRIEF DESCRIPTION OF THE DRAWINGS

FIG. 11A is a diagram of a format of a general format identifier GFI;

FIG. 11B is a diagram of a format of a logical channel group number LCGN;

FIG. 11C is a diagram of a format of a logical channel number LCN;

FIG. 11D is a diagram of a format of data FBh;

FIG. 11E is a diagram of a format of a transport block reject signal TBR;

FIG. 18 is a diagram of a one-touch dial table;

FIGS. 19A and 19B are flowcharts of a procedure to be executed, when setting up a call; and FIGS. 20A and 20B are flowcharts of a procedure to be executed when receiving a set-up call.

DESCRIPTION OF THE PREFERRED EMBODIMENTS

Figure 1A:
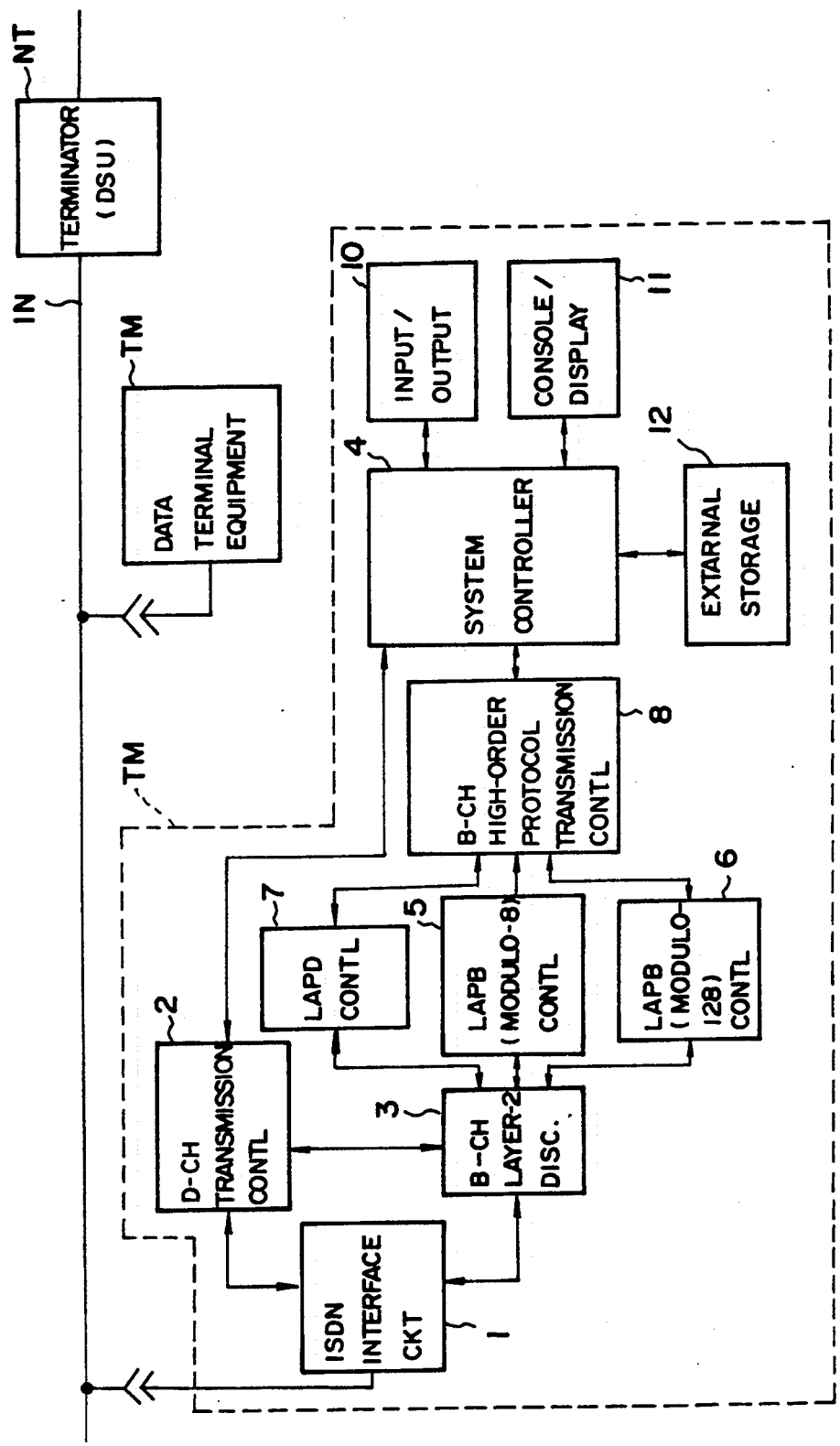
FIG. 1A is a block diagram of a data terminal equipment according to a first embodiment of the present invention.

A description is given of a preferred embodiment of the present invention with reference to FIG. 1A.

Figure 1B:
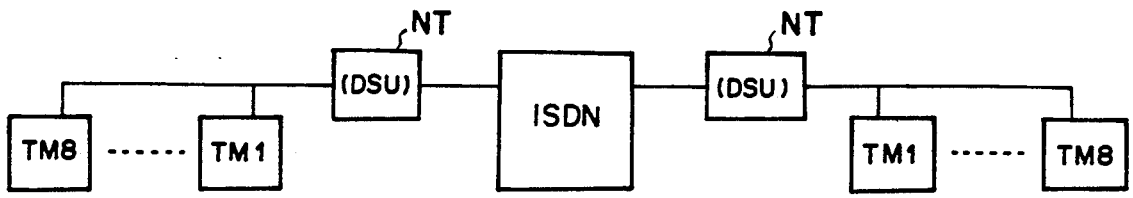
FIG. 1B is a block diagram of an example of the entire ISDN system.

Referring to FIG. 1A, there is illustrated an ISDN data terminal equipment according to a preferred embodiment of the present invention. A subscriber line or access line LN is of passive bus type suitable for the basic interface of ISDN, and is connected to a digital service unit DSU, which is also called a network terminator NT. It is possible to connect a maximum of eight data terminal equipments TM to the access line LN. As shown in FIG. 1B, the network terminator NT or digital service unit DSU is coupled to an ISDN.

Each of the data terminal equipments TM includes an ISDN interface circuit 1, which is physically connected to the access line LN and functions to separate and combine signals on the signal channel (D channel) and signals on the information channel (B channel) in ISDN. A signal on the D channel is exchanged between the ISDN interface circuit 1 and a D-channel transmission controller 2. A signal on the B channel is exchanged between the ISDN interface circuit 1 and a B-channel layer-2 (second layer) discrimination circuit 3.

The D-channel transmission controller 2 executes a signal control procedure and a data transmission control procedure for D channel. A variety of information necessary for those procedures is exchanged between the D-channel transmission controller 2 and a system controller 4.

The B-channel layer-2 discrimination circuit 3 executes, at the time of setting up a call, the following procedure on the basis of the contents of a link setting up signal which is transmitted from a calling terminal after line control on the D channel is completed. That is, the B-channel layer-2 discrimination circuit 3 discerns whether the protocol of the layer 2 related to the B channel is the aforementioned LAPB modulo-8 data link protocol, LAPB modulo-128 data link protocol, or LAPD data link protocol. When the discerned result indicates the LAPB modulo-8 data link protocol, the B-channel layer-2 discrimination circuit 3 activates an LAPB (modulo-8) controller 5, which controls data transmission after activated. When the discerned result indicates the LAPB modulo-128 data link protocol, the B-channel layer-2 discrimination circuit 3 activates an LAPB (modulo-128) controller 6, which controls data transmission after activated. When the discerned result indicates the LAPD data link protocol, the B-channel layer-2 discrimination circuit 3 activates an LAPD controller 7, which controls data transmission after activated.

A B-channel high-order protocol transmission controller (hereinafter simply referred to as controller) 8 executes transmission procedures related to high-order protocol layers which consists of the third layer and the higher-order layers on the B channel. The controller 8 exchanges data with the ISDN (FIG. 1B) through one of the protocol controllers 5, 6 and 7 which has been activated at this time. Further, the controller 4 exchanges data with a system controller 4. The system controller 4 controls an operation of the illustrated data terminal equipment TM. An input/output device 10, a console/display device 11 and an external storage device 12 are connected to the system controller 4. The input/output device 10 inputs and outputs transmission data. The console/operation device 11 inputs necessary information into the data terminal equipment TM and displays necessary information. The external storage device 12 stores data including transmission data. Further, the system controller 4 executes a control procedure for the highest-order protocol for data transmission which uses the B and D channels.

When the data terminal equipment TM sets up a call, the LAPB modulo-8 data link protocol is used as the data link protocol for B channel.

Figure 2A:
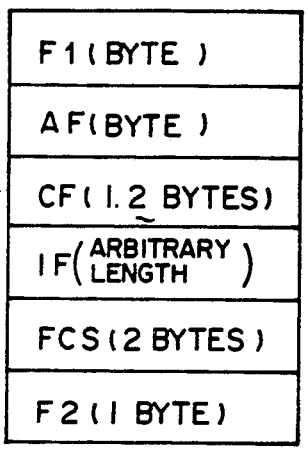
FIG. 2A is a diagram of a format of a signal in conformity to an LAPB.

A description is given of framed signals used in the LAPB and LAPD data link protocols. FIG. 2A is a diagram of the frame format of a signal based on the LAPB data link protocol. As illustrated, the LAPB frame format consists of data equal to one byte (1 octet) having a predetermined bit pattern. Details of the LAPB frame format are as follows. A flag F1 indicates the beginning of the frame. An address field AF has one-byte data indicating the other equipment. A control field CF has one- or two-byte data indicating the kind of signal. An information field IF is of an arbitrary length. In the information field IF, parameters dependent on the kind of signal or transmission information are stored. A frame check sequence FCS has two-byte data which is obtained by applying a generator polynomial to data between the first bit of the address field AF and the last bit of the information field IF. A cyclic redundancy check (CRC) code is applicable to the frame check sequence FCS, for example. A flag F2 is formed by the same bit pattern as the flag F1, and indicates the end of the frame.

Figure 2B:
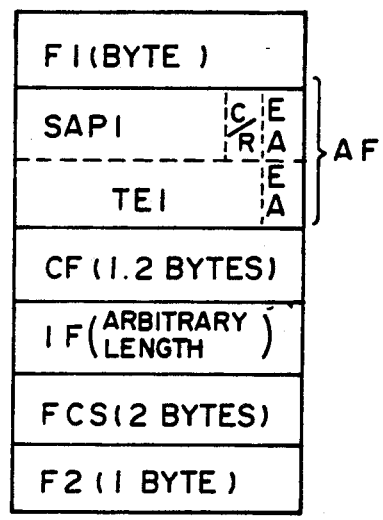
FIG. 2B is a diagram of a format of a signal in conformity to an LAPD.

FIG. 2B shows the frame format of a signal based on the LAPD data link protocol. As illustrated, the LAPD frame format is basically identical to the LAPB frame format shown in FIG. 2A. The LAPD frame format uses an address field AF' extended to two bytes. A service access point identifier SAPI for discriminating information transfer services presented to a higher-order layer by the layer 2 from one another is set by use of six high-order bits of the first one byte of the address field AF'. A C/R bit for discerning whether the content of the signal is a command or a response, is arranged in the seventh bit of the first one byte. An extended bit EA of a value of "0" which indicates that the address field AF is an extended field of LAPB is arranged in the eighth bit of the first one byte. A terminal end point identifier TEI for discriminating a plurality of terminals accommodated in the same access line from one another is arranged in seven high-order bits of the second one byte of the LAPD frame format. An extended bit of a value of "1" which indicates the end of the address field AF is arranged in the eighth bit in the second one byte.

The LAPB frame format is used in transmission of point-to-point type. Therefore, the address of a calling (source) terminal is fixed to an address of 03h (h represents hexadecimal digit), and the address of a called (destination) terminal is fixed to an address of 01h. The address of the other terminal is set in the address field AF of signal to be transmitted. The standard procedure of the LAPB data link protocol is the LAPB modulo-8 data link protocol, and the extended procedure is the LAPB modulo-128 data link protocol. Therefore, when a data terminal equipment which uses the LAPB modulo-8 data link protocol sets up a call, a call set-up signal which is transmitted for setting a link after the establishment of B channel is a set asynchronous balanced mode signal (hereinafter simply referred to as SABM signal), which is set to a bit pattern of 3Fh. When a data terminal equipment which uses the LAPB modulo-128 data link protocol sets up a call, a call set-up signal which is transmitted for setting a link after the establishment of B channel is a set asynchronous balance mode extended signal (hereinafter simply referred to as SABME signal), which is set to a bit pattern of 7Fh. It is noted that no information field IF is added to the SABM signal or SABME signal.

Figure 3A:
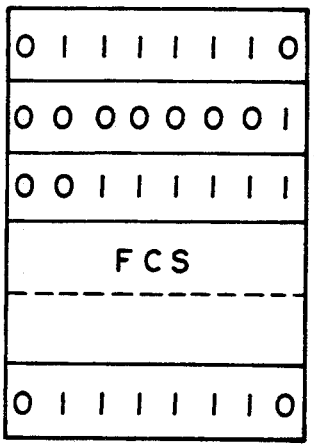
FIG. 3A is a diagram illustrating the contents of an SABM signal for the LAPB.
Figure 3B:
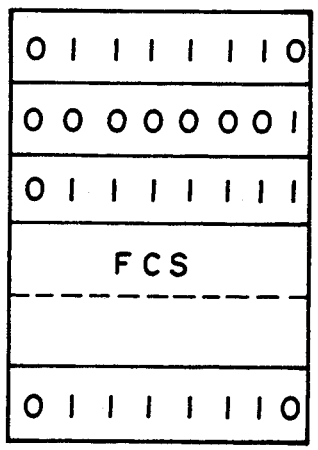
FIG. 3B is a diagram illustrating the contents of an SABME signal for the LAPB.

As a result, when the data terminal equipment which uses the LAPB modulo-8 data link protocol sets up a call, as shown in FIG. 3A, the call set-up signal which is transmitted for setting a link after the establishment of B channel is such that data 01h and 3Fh are set in the address field AF and the control field CF, respectively, and there is no information field IF. When the data terminal equipment which uses the LAPB modulo-128 data link protocol sets up a call, as shown in FIG. 3B, the call set-up signal which is transmitted for setting a link after the establishment of B channel is such that data 01h and 7Fh are set in the address field AF and the control field CF, respectively, and there is no information field IF.

Figure 3C:
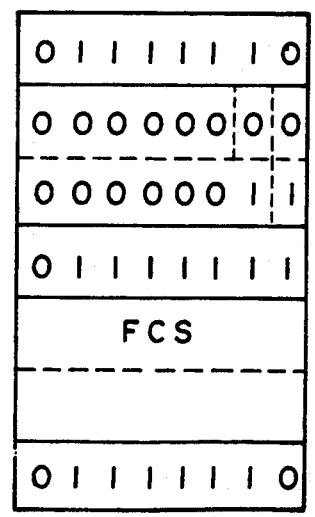
FIG. 3C is a diagram illustrating the contents of the SABME signal for the LAPD.

On the other hand, in the LAPD data link protocol, a calling terminal sends the SABME signal as a call set-up signal. At this time, since the signal is for call set-up, the access point identifier SAPI is "000000", and the C/R bit is 0. Therefore, when the data terminal equipment which uses the LAPD data link protocol sets up a call, as shown in FIG. 3C, the call set-up signal which is transmitted for setting a link after the establishment of B channel is such that data 00h and 7Fh are set in the address field AF' and the control field CF, respectively, and there is no information field IF. The terminal end identifier TEI (1 in this case) which is set in the other terminal, is set in the terminal end identifier TEI.

Figure 4:
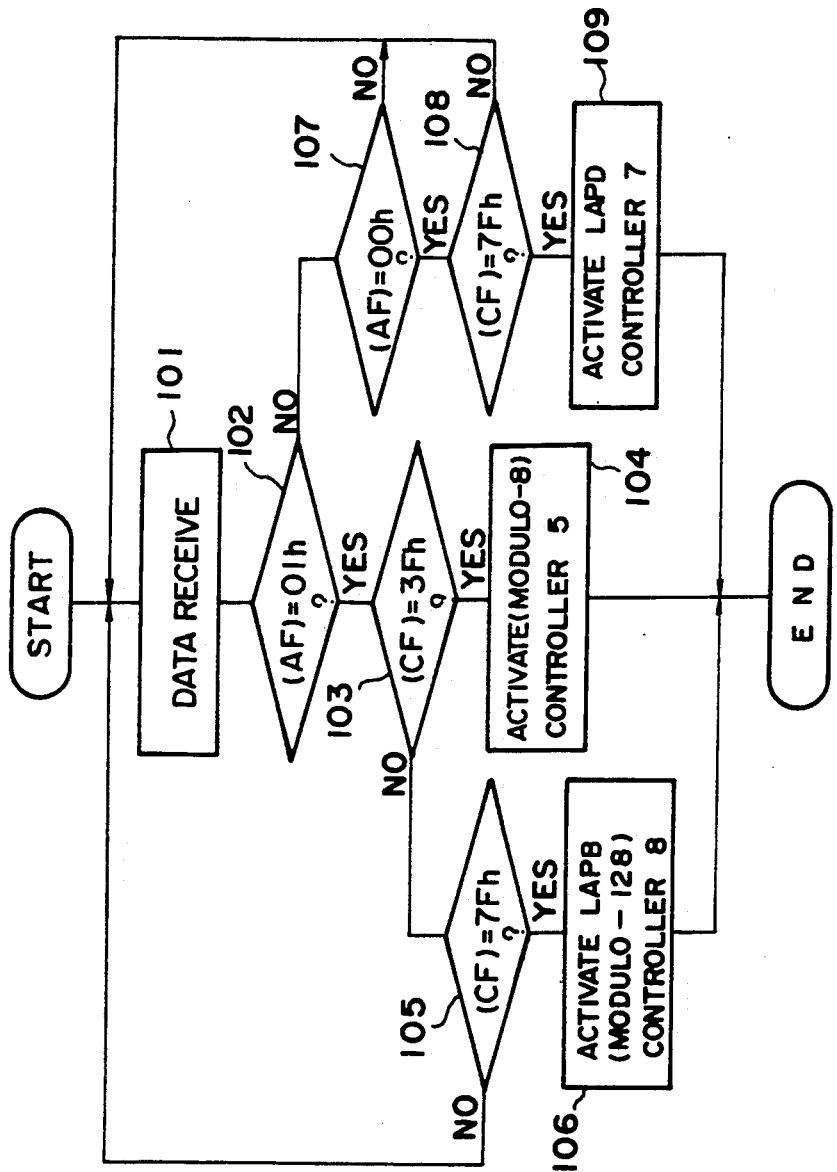
FIG. 4 is a flowchart of a procedure which is executed by a B-channel layer-2 discrimination circuit when receiving a call.

The B-channel layer-2 discrimination circuit 3 makes a decision on the kind of data link protocol related to the calling terminal in accordance with a procedure shown in FIG. 4. In the link setting and link resetting stages, when the first data is received (step 101), the B-channel layer-2 discrimination circuit 3 draws data from the address field which is of the first byte thereof, and determines whether the drawn data is 01h (step 102). When the result in step 102 is YES, the data link protocol being used is the LAPB data link protocol. Then, the B-channel layer-2 discrimination circuit 3 determines whether the content of the control field CF which is the second byte of the data received in step 101 is 3Fh (step 103). When the result in step 103 is YES, the content of the call set-up signal which has been received is the SABM signal for the LAPB data link protocol, and therefore the calling terminal uses the LAPB modulo-8 data link protocol. Thus, the B-channel layer-2 discrimination circuit 3 activates the LAPB modulo-8 controller 5 (step 104). Then data transmission is carried out under control by the activated LAPB modulo-8 controller 5.

On the other hand, when the result in step 103 is NO, the B-channel layer-2 discrimination circuit 3 discerns whether the content of the control field CF is 7Fh (step 105). When the result in step 105 is YES, the content of the call set-up signal which has been received is the SABME signal for the LAPB data link protocol, and therefore the calling terminal uses the LAPB modulo-128 data link protocol. Thus, the B-channel layer-2 discrimination circuit 3 activates the LAPB modulo-128 controller 6 (step 106). Then data is transmitted under control by the LAPB modulo-128 controller 6.

When the result in step 102 is NO, the B-channel layer-2 discrimination circuit 3 discerns whether the content of the address field AF is 00h (step 107). When the result in step 107 is YES, the B-channel layer-2 discrimination circuit determines whether the content of the control field CF which is the fourth byte data is 7Fh (step 108). When the result in step 108 is YES, the content of the call set-up signal which has been received is the SABME signal for the LAPD data link protocol and therefore the calling terminal uses the LAPD data link protocol. Thus, the B-channel layer-2 discrimination circuit 3 activates the LAPD controller 7 (step 109). Then data is transmitted under control by the LAPD controller 7. When the result in step 105, 107 or 108, the received signal is ignored since it does not relate to the procedure for setting a data link.

In the above-mentioned manner, according to the first embodiment, the B-channel layer-2 protocol to be used is determined on the basis of the contents of the address field and control field of the call set-up signal which has been received from the calling terminal when setting up a call related to the B-channel. Thus, it is possible to use a protocol suitable for the calling terminal and then suitably execute the data transmission procedure.

That is, when the data terminal equipment TM is called, the D-channel transmission controller 2 executes the line control which uses the ISDN and the D-channel so that a communication path is established. At this time, when a B-channel is established as a communication path, the D-channel transmission controller 2 activates the B-channel layer-2 discriminating circuit 3. Thereby, the B-channel layer-2 discrimination circuit 3 is switched to a waiting state where it waits for a call set-up signal supplied from a calling terminal. When a call set-up signal is received, the B-channel layer-2 discrimination circuit 3 executes the aforementioned procedure, and activates suitable one of the LAPB (modulo-8) controller 5, the LAPB (modulo-128) controller 6 and the LAPD controller 7 on the basis of the discrimination results. Then data is transmitted under control of the selected one of the data link protocol controllers. When the established data link is released and it is desired to establish a data link again, the data link protocol controller suitable for the data link protocol related to the calling terminal is activated in the same manner.

Figures 5A, 5B:
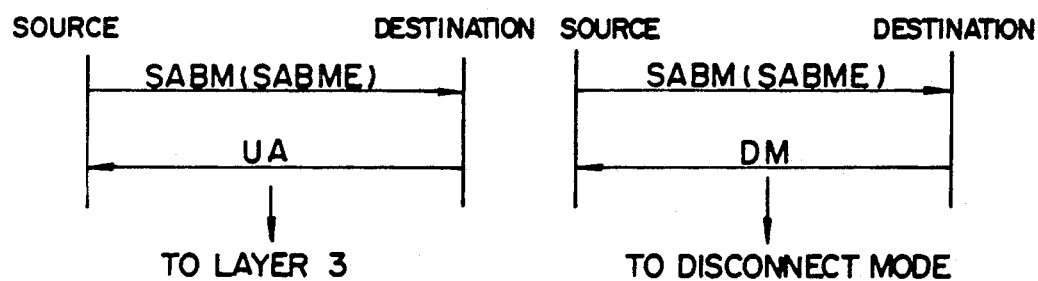
FIGS. 5A and 5B are time charts of signals used in a transmission procedure for the layer-2 protocol.

When the data terminal equipment TM shown in FIG. 1A sets up a call, it can identify the kind of layer-2 protocol for the B-channel which is used in the other terminal by the following procedure. The data terminal equipment TM sends the destination terminal the SABM (SABME) signal which is the call set-up signal for the layer-2 protocol. When the called terminal can operate in the layer-2 protocol set in the calling terminal equipment TM, the called terminal sends back an unnumbered acknowledge signal UA, as shown in FIG. 5A. Thereby the layer 2 is established, and the function provided by a higher-order layer (layer 3) can be activated. On the other hand, when the called terminal cannot respond to the received SABM (SABME) signal, it sends back a signal DM, as shown in FIG. 5B, which indicates that the destination terminal is switched to a disconnect mode. In this state, the called terminal waits for the source terminal TM to send the SABM or SABME signal indicating a layer-2 protocol in which the called terminal can operate. When the source terminal TM sends the layer-2 protocol to which the called terminal can respond, the layer 2 is established and then the function provided by the higher-order layer is activated.

Figure 6:
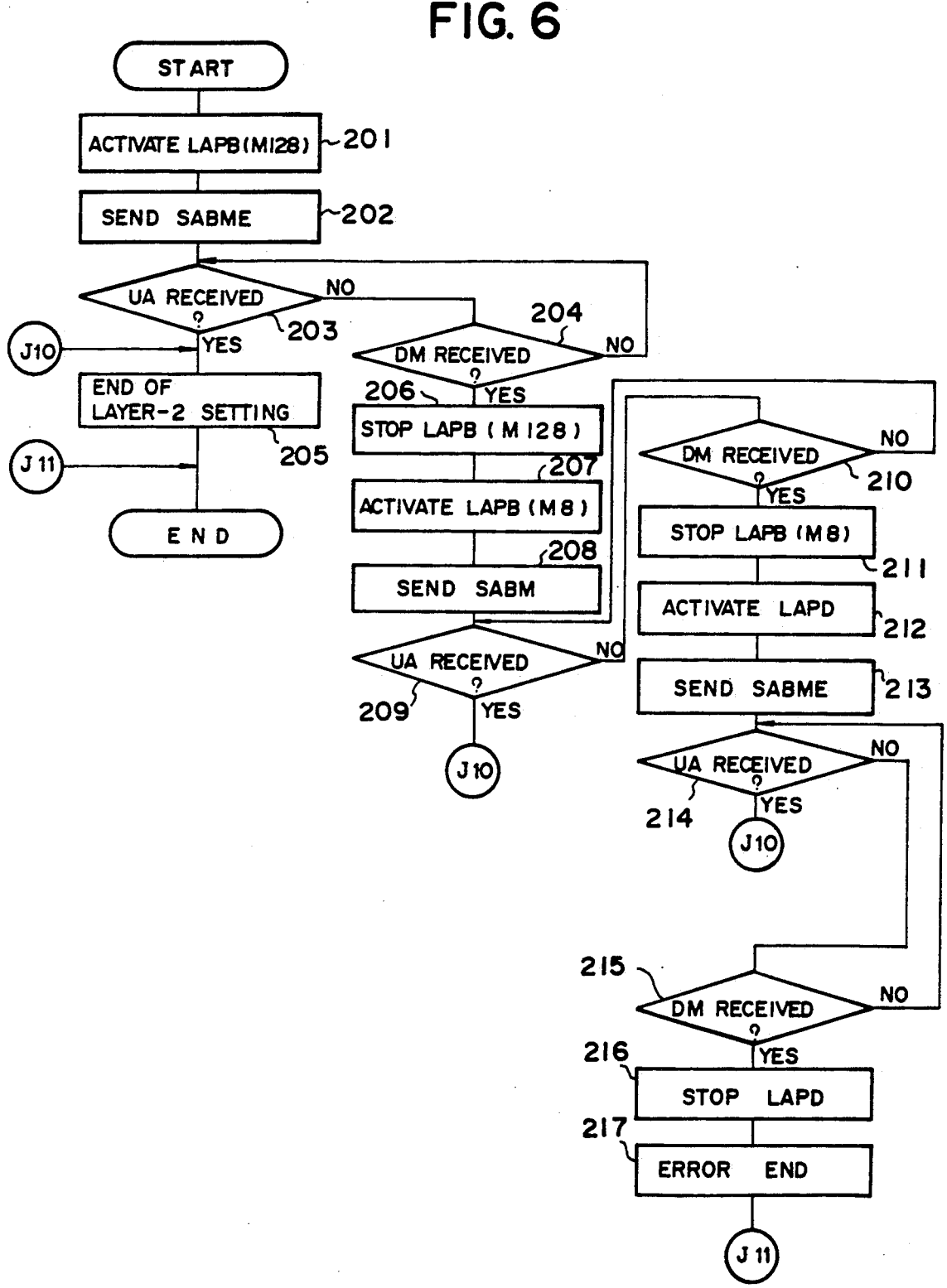
FIG. 6 is a flowchart of a procedure which is executed by the B-channel layer-2 discrimination circuit when setting up a call.

A description is given of an example of the above-mentioned layer-2 discrimination procedure which is to be executed at the time of setting up a call, by referring to FIG. 6.

The B-channel layer-2 controller 3 (FIG. 1A) activates the LAPB (modulo-128) controller 6 (step 201). The activated LAPB (modulo-128) controller 6 sends the SABME signal to the destination terminal through the B-channel layer-2 discrimination circuit 3 and the ISDN interface circuit 1 (step 202). Then the LAPB (modulo-128) controller 6 waits for the signal UA or DM sent from the called terminal (a NO loop consisting of steps 203 and 204). When the called terminal can use the LAPB (modulo-128) data link protocol as a layer-2 protocol and the called terminal sends back the signal UA, the result in step 203 is YES. The LAPB (modulo-128) controller 6 terminates the layer-2 protocol setting procedure (step 205) and activates the B-channel high-order protocol transmission controller 8. Thereby, protocols related to the higher-order layers are sequentially made active.

When the called terminal cannot respond to the LAPB (modulo-128) data link protocol and therefore sends back the signal DM, the result in step 204 is YES. In this case, the B-channel layer-2 discrimination circuit 3 stops the LAPB (modulo-128) controller 6 (step 206), and alternatively activates the LAPB (modulo-8) controller 5 (step 207). Then the B-channel layer-2 discrimination controller 3 has the LAPB (modulo-8) controller 5 send the SABM signal (step 208), and waits for the signal UA or DM sent from the called terminal (a NO loop consisting of steps 209 and 210). When the called terminal can use, as a layer-2 protocol, the LAPB (modulo-8) data link protocol and therefore sends back the signal UA, the result in step 209 is YES. In this case, the B-channel layer-2 discrimination circuit 3 terminates the layer-2 protocol setting procedure, and activates the B-channel high-order protocol transmission controller 8.

When the called terminal cannot respond to the LAPB (modulo-8) data link protocol and therefore sends back the signal DM, the result in step 210 is YES. In this case, the B-channel layer-2 discrimination circuit 3 stops the LAPB (modulo-8) controller 5 (step 211), and activates the LAPD controller 7 (step 212). Then the LAPD controller 7 sends the SABME signal so that the layer-2 protocol is started (step 213). Then the B-channel layer-2 discrimination circuit 3 waits for the signal UA or DM sent from the called terminal (a NO loop consisting of steps 214 and 215). When the called terminal can use, as a layer-2 protocol, the LAPD data link protocol and therefore sends the signal UA, the result in step 214 is YES. In this case, the procedure returns to step 205 and is then terminated. Then protocols related to the high-order layers are sequentially started. On the other hand, when the called terminal cannot use, as a layer-2 protocol, the LAPD data link protocol and sends the signal DM, the result in step 215 is YES. Then the B-channel layer-2 discrimination circuit 3 stops the LAPD controller 7 (step 216). In this case, it is impossible to set the layer-2 protocol, and therefore the procedure is terminated as error (step 217).

In the aforementioned manner, the source (calling) terminal identifies the layer-2 protocol which is available in the called terminal by referring to the signal which is sent back from the called terminal during a call set-up procedure for B-channel. Thereby, it is possible to use the protocol suitable for the called terminal and execute the data transmission procedure based on the determined data link protocol.

That is, when the data terminal equipment TM sets up a call to a destination terminal, the D-channel transmission controller 2 executes the line control which uses the ISDN and the D-channel so that a communication path is established. At this time, when a B channel is established as a communication path, the D-channel transmission controller 2 activates the B-channel layer-2 discrimination circuit 3. The activated B-channel layer-2 discrimination circuit 3 discriminates the data link protocol to be used by executing the aforementioned procedure shown in FIG. 6. Then the B-channel layer-2 discrimination circuit 3 activates, based on the discrimination result, one of the LAPD (modulo-8) controller 5, the LAPB (modulo-128) controller 6 and the LAPD controller 7. Then, data is transferred through the selected data link protocol controller. Thus, the data link protocol controller suitable for the called terminal is activated so that data can suitably be transferred.

Figure 7:
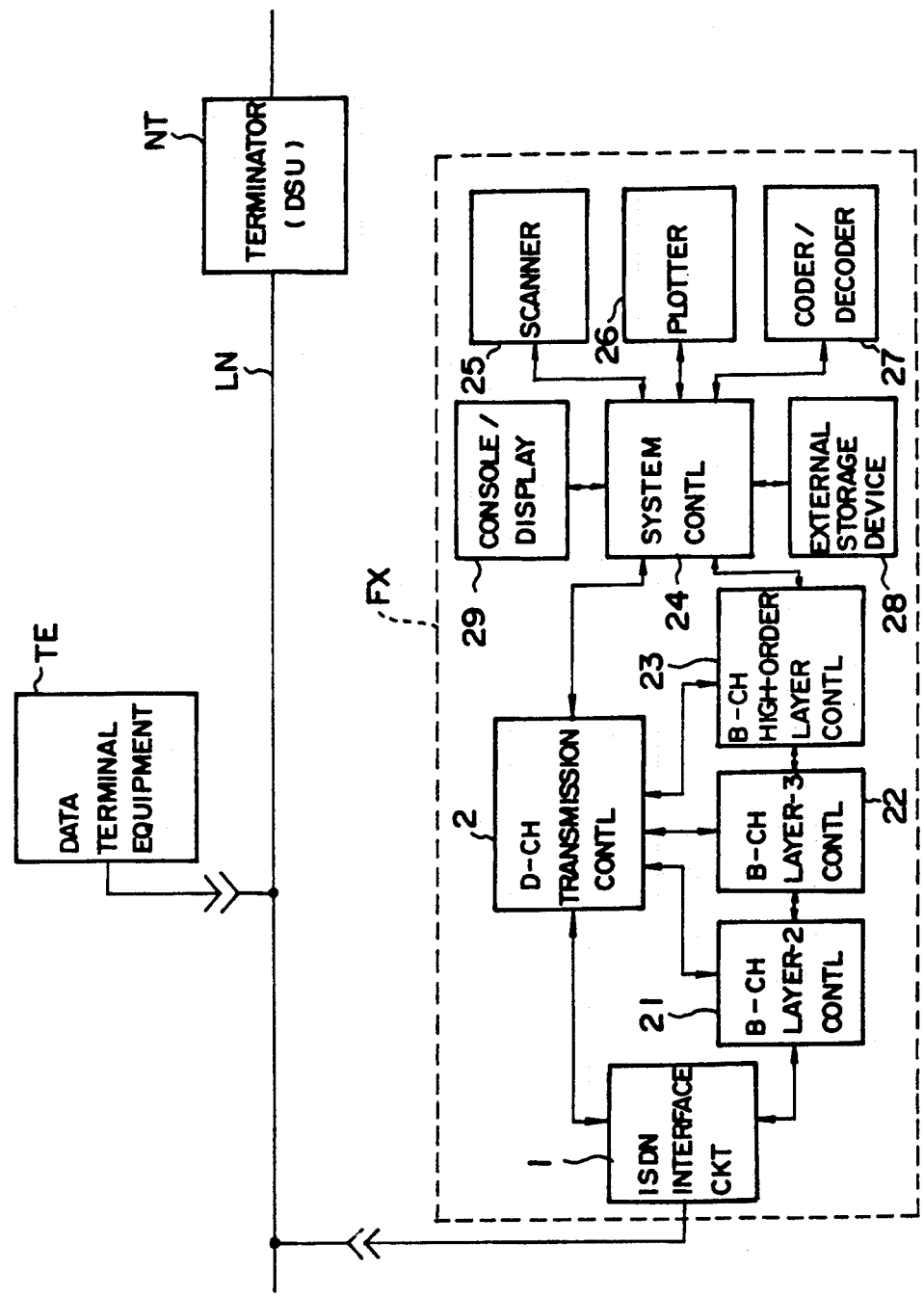
FIG. 7 is a block diagram of a facsimile machine according to a second preferred embodiment of the present invention.

A description is given of a second preferred embodiment of the present invention with reference to FIG. 7. In FIG. 7, those parts which are the same as those shown in the previous figures are given the same reference numerals.

The subscriber line LN is of passive bus type suitable for the basic interface of ISDN, and is connected to the digital service unit DSU (network terminator NT). It is possible to connect a maximum of eight data terminal equipments TM to the access line LN.

A group-4 facsimile machine FX serving as a data terminal equipment TM is constructed as follows. The ISDN interface circuit 1 is physically connected to the access line LN and functions to separate and combine signals on the signal channel (B channel) and signals on the information channel (B channel) in ISDN. A signal on the D channel is exchanged between the ISDN interface circuit 1 and the D-channel transmission controller 2. A signal on the B channel is exchanged between the ISDN interface circuit 1 and the B-channel layer-2 discrimination circuit 3.

The D-channel transmission controller 2 executes a signal control procedure for D channel and a data transmission procedure. Information necessary for those procedures is exchanged between the D-channel transmission controller 2, a B-channel layer-2 controller 21, a B-channel layer-3 controller 22, a B-channel high-order layer controller 23, and a system controller 24.

The B-channel layer-2 controller 21 controls B-channel layer-2 transmission. Signals related to B-channel are exchanged between the B-channel layer-2 controller 21 and the ISDN through the ISDN interface circuit 1. Further, signals related to a higher-order layer (third layer) are exchanged between the B-channel layer-2 controller 21 and the B-channel layer-3 controller 22.

The B-channel layer-3 controller 22 controls B-channel layer-3 transmission. Signals are exchanged between the B-channel layer-3 controller 22 and the ISDN through the B-channel layer-2 controller 21. Signals related to a higher-order layer, that is, the layer 4, are exchanged between the B-channel layer-3 controller 22 and the B-channel high-order layer controller 23.

The B-channel high-order layer controller 23 executes a B-channel transmission procedure related to high-order protocol layers equal to the fourth layer (layer 4) and the higher-order layers. The B-channel high-order layer controller 23 exchanges signals with the ISDN through the B-channel layer-3 controller 22, and further exchanges signals with a system controller 24. Each of the B-channel layer-3 controller 22 and the B-channel high-order layer controllers 23 has both the CCITT recommendation T.70 transmission function and the ISO standard ISO8208 transmission function.

The system controller 24 controls an operation of the group-4 facsimile machine FX. A scanner 25, a plotter 26 and a coder/decoder 27 are connected to the system controller 24. The scanner 25 reads a document to be scanned at a predetermined resolution level. The plotter 8 records an image on a recording medium (paper for example) at a predetermined resolution level. The coder/decoder 27 encodes and compresses an image signal derived from the scanner 25, and expands and decodes a coded and compressed image signal so that the original image signal can be generated. An external storage device 28 and a console/display device 29 are connected to the system controller 24. The external storage device 28 stores encoded and compressed data, and various data which the system controller 24 needs. The console/display device 29 inputs necessary data in the group-4 facsimile machine FX and displays necessary information.

The system controller 24 controls a highest-order data transmission protocol which uses the B and D channels.

Figure 8:
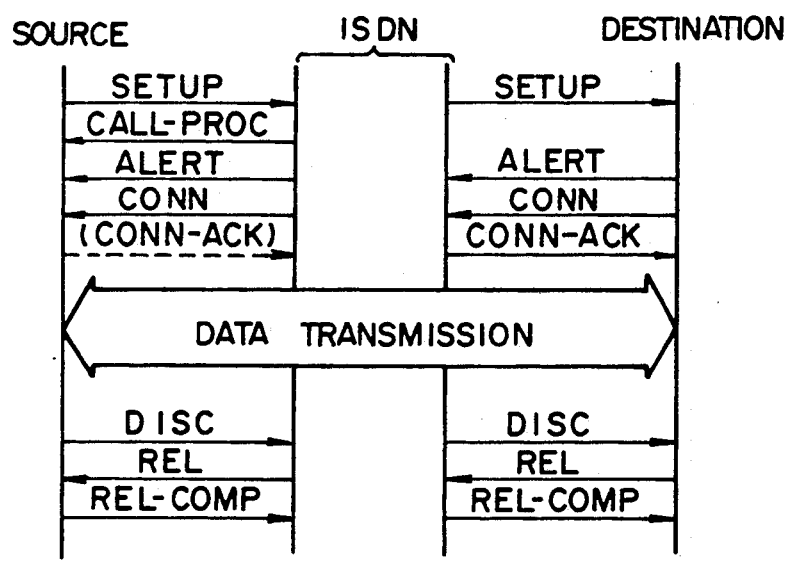
FIG. 8 is time chart of signals used in an ISDN transmission procedure.

A description is given of a fundamental data transmission procedure which is performed in the ISDN data terminal equipment TM such as the illustrated group-4 facsimile machine FX with reference to FIG. 8.

First, a calling terminal sends a call set-up message SETUP to the ISDN and thus requests a call set-up to a destination terminal. The ISDN sends the call set-up message SETUP to the specified destination terminal and thereby calls out the destination terminal. Further, the ISDN sends the calling terminal a call proceeding message CALL PROC for informing the calling terminal of the status of call set-up.

When the called terminal detects the call-in and is in a communication active state, it sends the ISDN an alerting message ALERT. Then, the ISDN sends the calling terminal the alerting message ALERT so that it lets the calling terminal know that calling (ringing) to the called terminal has been started. When the called terminal replies to the call, it sends the ISDN a connect message CONN. Then the ISDN sends the calling terminal the connect message CONN to thereby let the calling terminal know the called terminal has accepted the call. The ISDN sends the called terminal a connect acknowledge message CONN ACK. At this time, an information channel for data transmission between the calling terminal and called terminal is established.

Thereby, data can be exchanged between the calling terminal and called terminal according to the respective transmission control procedures. For example, the group-4 facsimile machine FX executes image information transmission based on the group-4 facsimile transmission control procedure.

When data transmission is completed, the calling terminal sends the ISDN a disconnect message DISC so that the information channel is requested to be released from the connected state. Then the ISDN sends the called terminal the disconnect message DISC so that it lets the called terminal know the information channel is cleared. Thereby, the called terminal sends back the ISDN a release message REL which lets the ISDN know the completion of channel disconnection. Then, the ISDN sends the calling terminal the release message REL. When the information channel is cleared by the calling terminal, it sends the ISDN a release completion message REL COMP so that the release of the information channel has been effected. Thus, the information channel between the calling terminal and the called terminal is completely released.

Figures 9A, 9B:
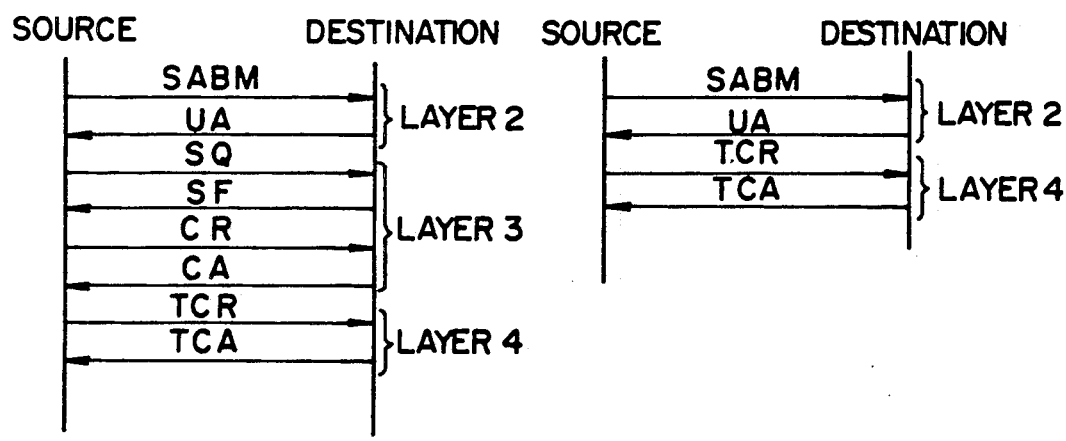
FIG. 9A is a time chart of signals used in a transmission procedure based on the ISO standard ISO8208 transmission procedure.
FIG. 9B is a time chart of signals used in a transmission procedure based on the CCITT recommendation T.70.

When the ISO standard ISO8208 is used for providing a transmission function on information channel, a transmission procedure to be executed when starting transmission is as shown in FIG. 9. Referring to FIG. 9, a calling terminal sends the ISDN the call set-up message SETUP. Then the ISDN sends a called terminal the call set-up SETUP. When the called terminal replies to the call, it sends the ISDN the connect message CONN. Then the ISDN sends the calling terminal the connect message CONN. Then the calling terminal sends the ISDN the connect acknowledge message CONN ACK. Then the ISDN sends the called terminal the connect acknowledge message CONN ACK. Thereby, an information channel between the calling terminal and the called terminal is established.

The calling terminal sends the ISDN the call set-up signal SABM related to the layer 2 for setting a link through the ISDN. When the called terminal can accept this call, it sends the signal UA to the calling terminal through the ISDN. Thereby, the layer 2 is established. Thereafter in order to establish the end-to-end communication in the layer 3, the calling terminal sends the ISDN the restart request packet SQ, which is supplied to the called terminal as a signal SI. When the called terminal accepts the request, it sends back the request confirmation packet SF through the ISDN. Thereby, the layer 3 is established. Thereafter, the calling terminal sends the ISDN a signal CR, which is sent to the called terminal as a signal CN. When the called terminal accepts the request, the called terminal sends back the ISDN a signal CA, which is sent to the calling terminal CN. Thereafter, in order to establish the transport layer, i.e., the layer 4, the calling terminal sends a transport connect request signal TCR to the called terminal through the ISDN. When the called terminal accepts the request, it sends back the ISDN a transport connect accept signal TCA through the ISDN. Thereby, the layer 4 is established. After that, a conventional transmission procedure related to higher-order layers is executed so that data transmission is carried out.

When the CCITT recommendation T.70 is used for providing a transmission function on information channel, the procedures indicated by (*) are omitted. That is, the calling terminal sends the call set-up signal SABM to the destination terminal through the ISDN. When the called terminal accepts this request, it sends back the calling terminal the acknowledgement signal ACK through the ISDN. Thereby, the layer 2 is established. It is noted that there is no recommendation with respect to the layer 3. For this reason, in order to establish the layer 4 which is the transport layer, the calling terminal sends the called terminal the transport connect request signal TCR through the ISDN. When the called terminal accepts the request, it sends back the calling terminal the transport connect acknowledge signal TCA through the ISDN. Thereby, the layer 4 is established. Thereafter, procedures related to higher-order layers are executed.

It can be seen from the above-mentioned description that the ISO standard ISO8208 differs from the CCITT recommendation T.70 in procedures related to the layer 3 or higher-order layers. As a result of this difference, the called terminal can identify the transmission function being used by referring to the contents of the signal which has first been received after starting the transmission procedure for the layer 3.

Figure 10A:
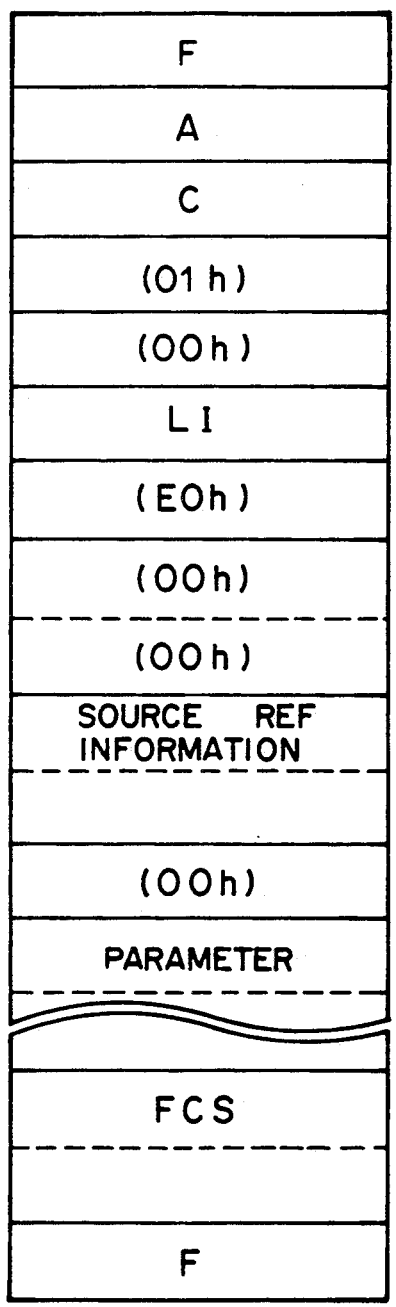
FIG. 10A is a diagram of a format of a transport connect request signal TCR.
Figure 10B:
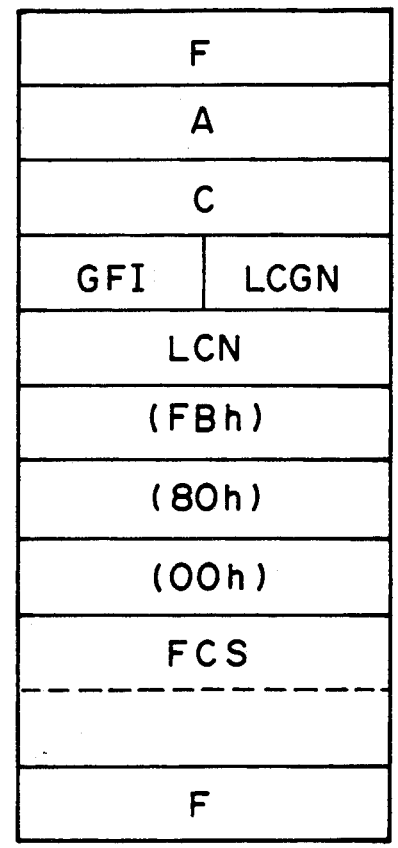
FIG. 10B is a diagram of a format of a restart request packet signal SQ.

FIG. 10A shows a format of the signal TCR in conformity to the CCITT recommendation T.70, and FIG. 10B shows a format of the signal SQ in conformance with the ISO standard ISO8208.

The signal TCR includes a flag field F, an address field A and a control field C in this sequence from the beginning thereof. The control field C is followed by 01h and 00h which form a header of the layer 3, which precedes a signal block related to the layer 4. The signal TCR ends with the flag check sequence FCS and the flag F related to the layer 2. The block related to the layer 4 includes an indicator field LI which indicates the entire length of the signal block related to the layer 4, and a block type field E0h which represents the signal TCR. Further, the signal block related to the layer 4 includes a function sign field which contains 00h, 00h, predetermined transmission source reference information (other than 00h) and 00h, and a parameter field which indicates information such as the block size.

The signal SQ shown in FIG. 10B includes a flag field F which is a header of the layer 2, an address field A, and a control field C in this order from the beginning thereof. The control field C is followed by a general format identifier GFI which is a header related to the layer 3, a logical channel group number LCGN, a logical channel number LCN, a packet type identifier of FBh representing the signal SQ, a disconnect cause field of 80h (DTE restart), and a diagnosis code field of 00h (no additional information). A flag check sequence FCS and a flag F are arranged in the end of the signal SQ.

FIG. 11A illustrates a format of the general format identifiers GFI for modulo-8 and modulo-128. FIG. 11B illustrates a format of the logical channel group number LCGN which indicates group numbers of from 0 to 15. FIG. 11C illustrates a format of the logical channel number LCN which represents a number of between 0 and 255. FIG. 11D illustrates a format of the packet type identifier FBh.

As described above, the signal TCR is different from the signal SQ in the contents of the header related to the layer 3. Therefore, it is possible to discriminate the type of the received signal by referring to the header related to the layer 3.

Figure 12:
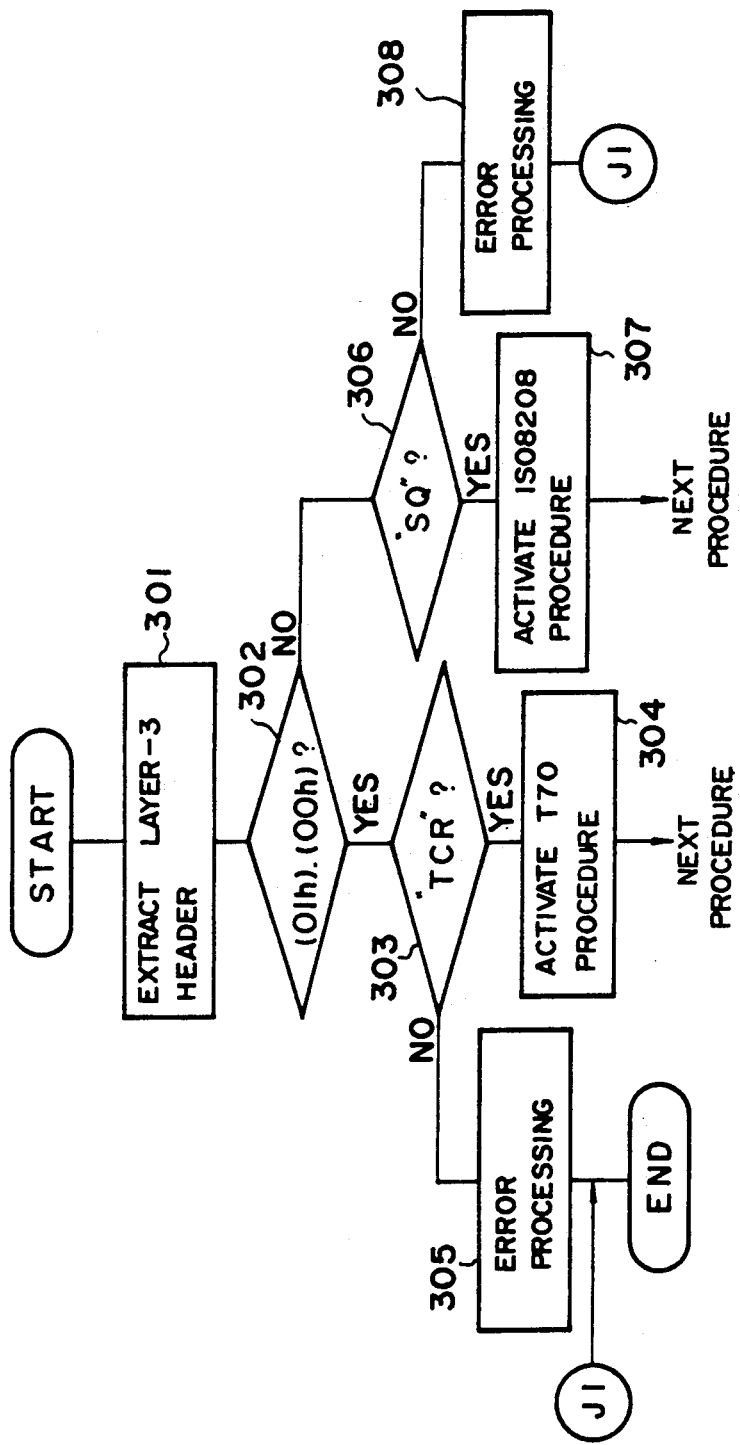
FIG. 12 is a flowchart of a procedure executed by a B-channel layer-3 controller.

When the call setting up procedure is started and the data link for the layer 2 is established by the B-channel layer-2 controller 21 of the called terminal, the B-channel layer-3 controller 22 executes a procedure shown in FIG. 12 so that it can identify transmission functions related to the layer 3 and higher-order layers, and sends the discrimination results to the B-channel high-order layer controller 23.

Referring to FIG. 12, when the B-channel layer-3 controller 22 receives the first signal from the B-channel layer-2 controller 21, it extracts the header related to the layer 3 therefrom (step 301), and discerns whether the contents of the first two octets are 01h and 00h (step 302). When the result in step 302 is YES, the received signal is based on the CCITT recommendation T.70. Then the B-channel layer-3 controller 22 determines whether the content of the block type field located at the second octet of the layer-4 signal block is E0h which represents the signal TCR (step 303). When the result in step 303 is YES, the B-channel layer-3 controller 22 activates the procedure based on the CCITT recommendation T.70, and informs the high-order layer controller 23 of the activated procedure (step 304). Then an arbitrary conventional procedure is executed. On the other hand, when the result in step 303 is NO, the received signal is incorrect. Thus, a corresponding error procedure is executed (step 308).

When the result in step 302 is NO, the received signal is based on the ISO standard ISO8208. Then the B-channel layer-3 controller 22 determines whether the packet type identifier in the layer-3 header is FBh which indicates the signal SQ (step 306). When the result in step 306 is YES, the B-channel layer-3 controller 22 activates the procedure based on the ISO standard ISO8208 and lets the B-channel high-order controller 23 know the activated procedure (step 307). Thereafter, an arbitrary conventional procedure is executed. When the result in step 306 is NO, the received signal is incorrect, and a corresponding error procedure is carried out (step 308).

Thereby, before starting a procedure related to the high-order layer for B channel, it is possible to select the transmission procedures related to the layers 3 and 4 which are the same as those in the calling terminal As a result, a subsequent data transmission procedure can suitably be executed.

In the second embodiment, the called terminal can know the B-channel transmission function provided by the calling terminal by analyzing the procedure signals supplied from the calling terminals, so that the called terminal can select the same transmission function as the calling terminal. It is however noted that the calling terminal can know the terminal function of the called terminal but cannot know the B-channel transmission function thereof in the call set-up procedure.

A description is given of a third embodiment of the present invention in which the calling terminal selects the B-channel transmission function suitable for that of the called terminal. It is now assumed that the B-channel transmission function of the calling terminal is based on the CCITT recommendation T.70, and the B-channel function of the called terminal is based on the ISO standard ISO08208. In this case, a set-up call is cleared in the following manner.

Figure 13A:
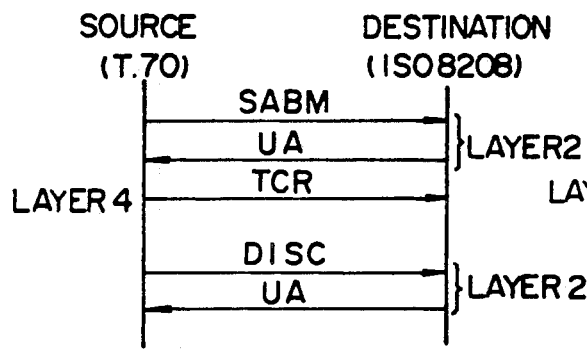
FIG. 13A is a time chart of signals used when call connection is cleared where the B-channel transmission function of a calling terminal is based on the CCITT recommendation T.70 and the B-channel transmission function of a called terminal is based on the ISO8208 according to a third preferred embodiment of the present invention.

For example, as shown in FIG. 13A, it is assumed that the calling terminal sends the transport connect request signal TCR for the layer 4 after the link related to the layer 2 has been established and that the called terminal ingores the TCR because it is not an appropriate signal. In this case, the calling terminal cannot receive a response to the signal TCR within a predetermined time. Therefore, the calling terminal sends the disconnect signal DISC related to the layer 2 and thereby lets the called terminal know that call connection is cleared. In response to the disconnect signal DISC, the called terminal sends back the signal UA which is an acknowledgement of the disconnect signal DISC. Thereby, call connection on B channel is cleared.

Figure 13B:
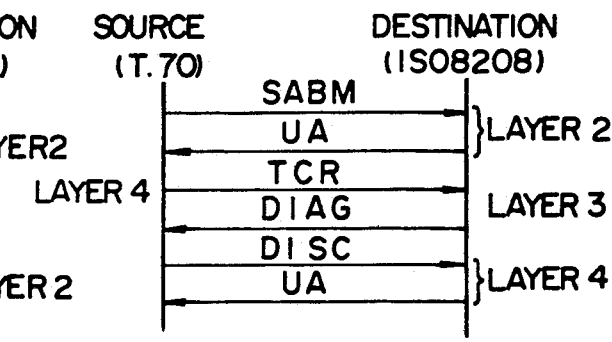
FIG. 13B is another time chart of signals used when call connection is cleared where the B-channel transmission functions of calling and called terminals are based on the CCITT recommendation T.70 and the ISO8208.

As shown in FIG. 13B, when the called terminal returns a diagnosis signal DIAG related to the layer 3 in response to the signal TCR sent from the calling terminal, the call terminal sends the disconnect signal DISC related to the layer 2 at this time so that it lets the called terminal know that call connection is cleared. In response to the disconnect signal DISC, the called terminal sends back the signal UA, so that call connection on B-channel is cleared.

Figure 14A:
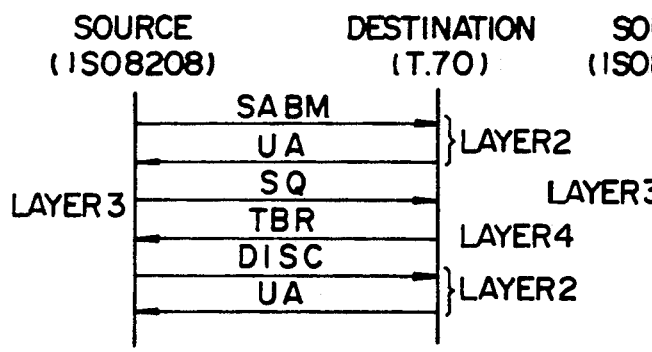
FIG. 14A is a time chart of signals used when call connection is cleared where the B-channel transmission functions of calling and called terminals are based on the ISO8208 and the CCITT recommendation T.70, respectively, according to the third embodiment of the present invention.

It is alternatively assumed that the B-channel transmission function of the call terminal is based on the ISO standard ISO8208 and the B-channel transmission function of the called terminal is based on the CCITT recommendation T.70. In this case, a set-up call is cleared as follows. As shown in FIG. 14A, when the link for the layer 2 is established and the calling terminal sends the signal SQ related to the layer 3, the called terminal sends back the calling terminal a transport block reject signal TBR which indicates that the signal SQ is ignored or an undefined signal related to the layer 4 is received. Thereby, the calling terminal sends the disconnect signal DISC related to the layer 2. The called terminal sends back the signal UA. Thus, the set-up call on B-channel is cleared. FIG. 11E is a diagram of a format of the transport block signal TBR.

Figure 14B:
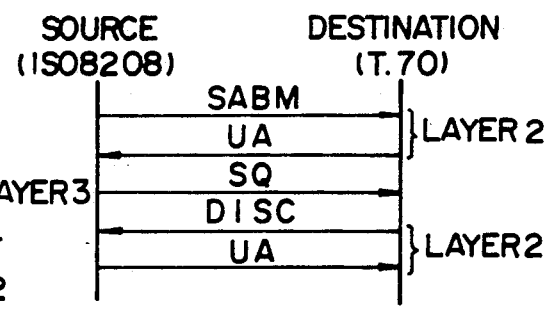
FIG. 14B is another time chart of signals used when call connection is cleared where the B-channel transmission functions of calling and called terminals are based on the ISO8208 and the CCITT recommendation T.70, respectively.

Alternatively, as shown in FIG. 14B, when the calling terminal sends the signal SQ, the called terminal sends back the disconnect signal DISC to clear the set-up call because it has received an unexpected signal. Then the calling terminal sends the signal UA. Thereby, the set-up call on B-channel is cleared.

Figure 15:
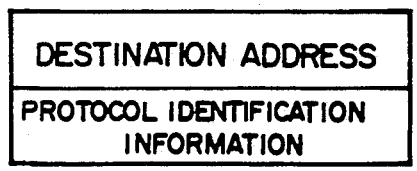
FIG. 15 is a diagram of a format of protocol management information.

According to the third embodiment, as shown in FIG. 15, protocol management information is formed for each destination. Protocol management information is formed by a set of destination information and protocol identification information which indicates a protocol to be used as the B-channel transmission function in the destination terminal. The protocol management information is stored in a predetermined storage area in the external storage device 28 (FIG. 7). The B-channel transmission function is selected based on the contents of the external storage device 28.

Figure 16:
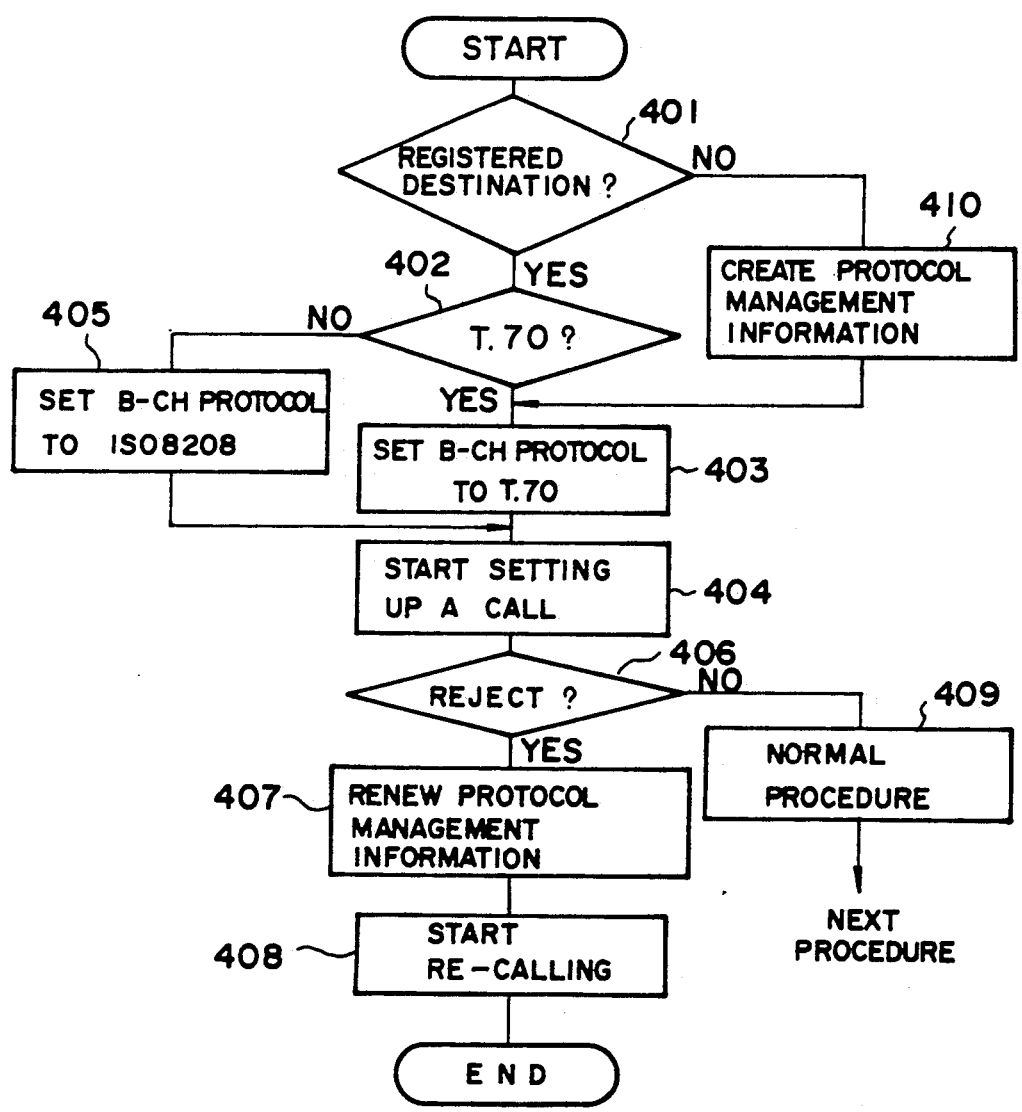
FIG. 16 is a flowchart of a call set-up procedure.

The procedure according to the third embodiment is described with reference to FIG. 16. When a call is generated, the system controller 24 of the calling terminal determines whether the destination address designated at that time has been registered in protocol management information stored in the external storage device 28 (step 401). When the result in step 401 is YES, the system controller 24 reads out the contents of the protocol identification information contained in the protocol management information, and determines whether the read-out contents are based on the CCITT recommendation T.70 (step 402). When the result in step 402 is YES, the system controller 24 controls the B-channel layer-3 controller 22 and the B-channel high-order layer controller 23 so as to be based on the CCITT recommendation T.70 (step 403), and starts setting up a call. On the other hand, when the result in step 402 is NO, the system controller 24 controls the B-channel layer-3 controller 22 and the B-channel high-order layer controller 23 so as to be based on the ISO standard ISO8208 (step 405). Then the procedure proceeds to step 404.

Then the system controller 24 discerns whether the called terminal rejects call connection (step 406). When the result in step 406 is YES, the system controller 24 renews the protocol identification information being registered in the protocol management information (step 407), and starts up re-calling to the same destination terminal (step 408). On the other hand, when the result in step 406 is NO, a conventional procedure is subsequently executed (step 409).

When the protocol management information having the same destination information as the designated destination information is not stored in the external storage device 28, protocol management information which has the designated destination information of concern and protocol identification information based on the CCITT recommendation T.70 is newly created and stored in the external storage device 28 (step 410). Then the procedure proceeds to step 403. Therefore, when the destination terminal is called by using protocol identification information which has been registered in protocol management information, if call connection is rejected, the registered contents related to the called terminal are renewed and re-calling is started. As a result, at the time of re-calling, call connection is not rejected on the ground of a difference of B-channel transmission function. Further, since the contents of the protocol identification information are renewed so that the transmission function available in the destination terminal is newly registered, the next request of call connection is not rejected on the ground of a difference of B-channel transmission function. As a result, an appropriate calling operation can be established. Moreover, when a destination terminal which has not yet been called is called, related protocol management information is newly generated and the CCITT recommendation T.70 is set as the initial transmission function. Therefore, when the same destination terminal is called again, call connection is not rejected.

As described above, the calling terminal creates protocol management information related thereto when calling the same for the first time, and the B-channel transmission function is set by referring to the registered protocol management information. Consequently, call connection is not rejected on the ground of a difference of B-channel transmission function.

In the aforementioned third embodiment, the case where the calling terminal fails to establish call connection to the called terminal is deemed to be based on a difference in B-channel transmission function. Alternatively, as shown in FIG. 13B, when the diagnosis signal DIAG is sent back from the called terminal so that a cause of clearance of call connection can be obtained, protocol management information is renewed based on the cause. For example, when it is found from the diagnosis signal DIAG that a fault occurs in the called terminal, protocol management information is not renewed because a cause of fault is not based on a difference in B-channel transmission function.

In group-4 facsimile machines which use ISDNs as transmission lines, a line switching system or a packet exchange system can be used as an exchange system for lines. Further, one of the LAPB data link protocol and the LAPD data link protocol can be used as the data link layer (layer 2) protocol. In this case, the modulo size can be set equal to 8 or 128. Moreover, it is possible to use either the CCITT recommendation T.70 transmission function or the ISO standard ISO8208 transmission function when a line switching system is employed for the network layer (layer 3). As shown above, in group-4 facsimile machines, it is possible to selectively use a plurality of protocols. For this reason, there is a possibility that a protocol available in a calling terminal may be different from that in a called terminal.

A fourth embodiment is configured taking account of the above-mentioned possibility. According to the fourth embodiment, kinds of protocols provided in a called terminal with which a call terminal may communicate are registered in the calling terminal. When a terminal discriminates the other terminal during call-out or call-in, transmission controllers related to the respective layers are provided with suitable protocols to be used.

Figure 17:
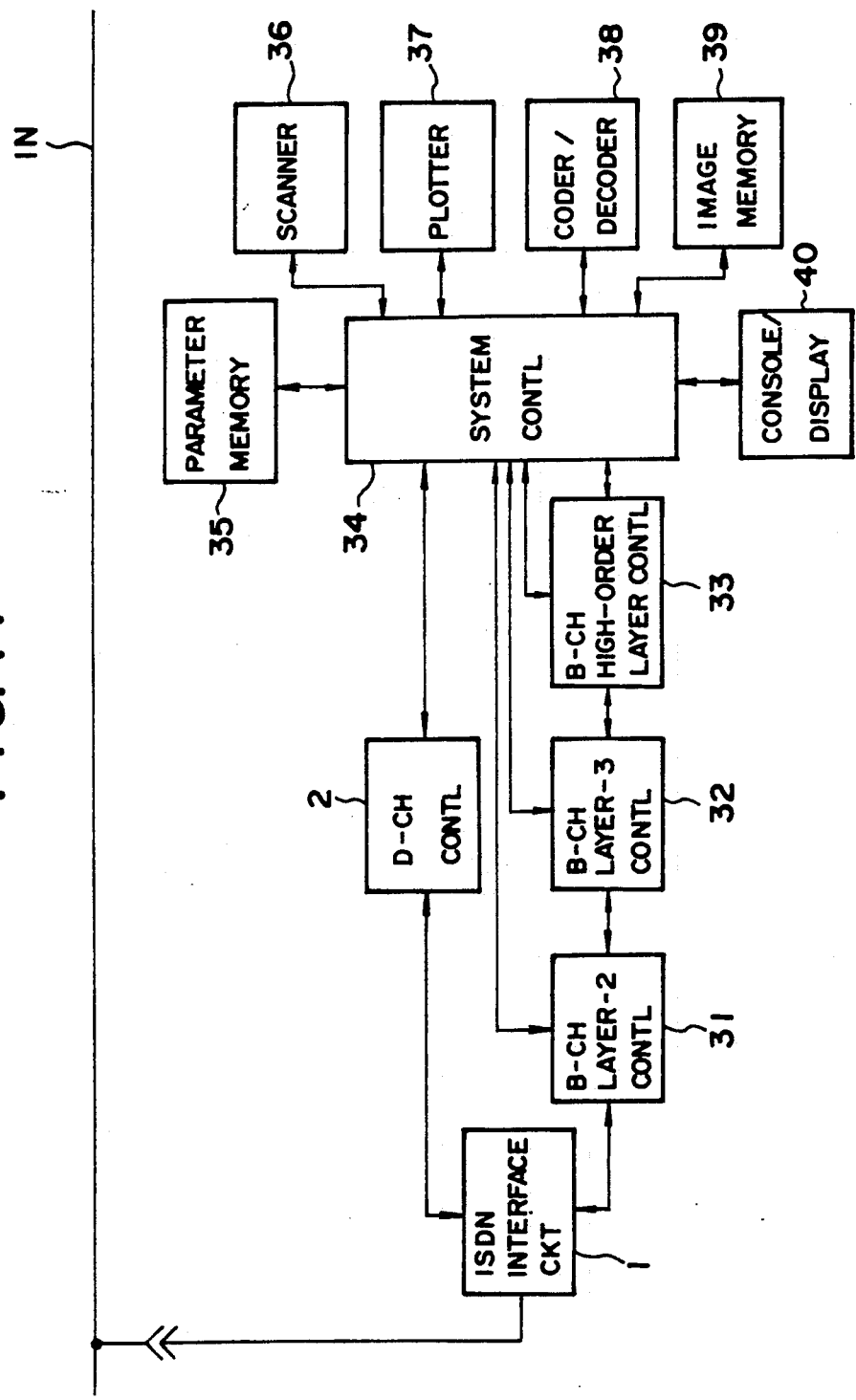
FIG. 17 is a block diagram of a group-4 facsimile machine according to a preferred fourth embodiment of the present invention.

The fourth embodiment is further described in detail with reference to FIG. 17, which is a block diagram of a facsimile machine according to the fourth embodiment of the present invention. In FIG. 17, those parts which are the same as those in the previous figures are given the same reference numerals. Referring to FIG. 17, a B-channel layer-2 transmission controller 31 processes a B-channel layer-2 transmission function and exchanges B-channel signals with the ISDN through the ISDN interface circuit 1. Further, the B-channel layer-2 transmission controller 31 exchanges signals related to the higher-order layer (layer 3) with a B-channel layer-3 controller 32.

The B-channel layer-3 transmission controller 32 processes a B-channel layer-3 transmission function, and exchanges signals with the ISDN through the B-channel layer-2 transmission controller 31. Further, the B-channel layer-3 transmission controller 32 exchanges signals related to the higher-order layer (layer 4) with a B-channel high-order layer transmission controller 33.

The B-channel high-order layer controller 33 processes B-channel transmission functions related to the layer 4 and higher-order layers. The B-channel high-order layer controller 33 exchanges data with the ISDN through the B-channel layer-3 transmission controller 32, and exchanges transmission data with a system controller 34.

The B-channel layer-2 transmission controller 31 can provide all layer-2 protocols (including a packet mode protocol) which are available in the group-4 facsimile machine. The B-channel layer-3 transmission controller 32 can provide all layer-3 protocols (including a packet mode protocol) which are available in the group-4 facsimile machine.

The system controller 34 controls a facsimile operation of the group-4 facsimile machine. Further, the system controller 34 controls data exchange with the D-channel transmission controller 2, protocol setting procedures through the B-channel layer-2 transmission controller 31 and the B-channel layer-3 transmission controller 32, and data exchange with the B-channel high-order layer transmission controller 33.

A parameter memory 35 stores a variety of information peculiar to the group-4 facsimile machine, such as information on a one-touch dial table. A scanner 36 reads a document at a predetermined resolution level. A plotter 37 prints an image on a recording medium such as paper with a predetermined resolution level.

A coder/decoder 38 encodes and compresses an image signal derived from the scanner 36, and expands and decodes an encoded and compressed image signal so as to reproduce the original image signal. An image memory 39 stores image signals which have been encoded and compressed. A console/display device 40 has operation keys such as one-touch dial keys through which telephone numbers of destination terminals can be input by one touch, and a liquid crystal display which presents operation guidances to the operator, for example.

FIG. 18 shows an example of the one-touch dial table stored in the parameter memory 35. The one-touch dial table stores the following information for each of the one-touch dial keys. A one-touch dial number is assigned each of the one-touch dial keys. ISDN address information indicates a registered destination telephone number. Sub-address information indicates a destination sub-address. Exchange system information indicates an exchange system which is used when communicating with the destination terminal. Layer-3 protocol information indicates the type of layer-3 protocol related to the B-channel. Layer-3 modulo size information indicates a layer-3 modulo size related to the B channel. Layer-2 protocol-information represents the type of layer-2 protocol related to the B-channel. Layer-2 modulo size information represents a layer-2 modulo size related to the B-channel.

At least ISDN address information, sub-address information and exchange system information among the above-mentioned table elements are input by the operator when registering one-touch dial number. The operator may input other information when registering one-touch dial number.

Information which has not been registered is given a no registration code. When information which indicates the CCITT recommendation T.70 is given to the layer-3 protocol, in actuality the layer-3 protocol is omitted, and therefore a blank code is given as the content of layer-3 modulo size information.

A description is given of a procedure for discriminating layer-2 protocols and a procedure for discriminating layer-3 protocols. When terminating a call, layer-2 protocols can be discriminated by the same procedure as that shown in FIG. 4. On the other hand, when setting up a call, layer-2 protocols can be discriminated by the same procedure as that shown in FIG. 6. When terminating a call, layer-3 protocols can be discriminated by the same procedure as that shown in FIG. 11. On the other hand, when setting up a call, layer-3 protocols can be discriminated by the same procedure as that shown in FIG. 16.

When the other terminal is set in the packet mode, a call set-up message SETUP supplied from ISDN contains an information element which lets the called terminal know the occurrence of a call. Therefore, the called terminal can discern whether the calling terminal is in the packet mode or the line switching mode by analyzing the received call set-up message SETUP.

Figure 19A:
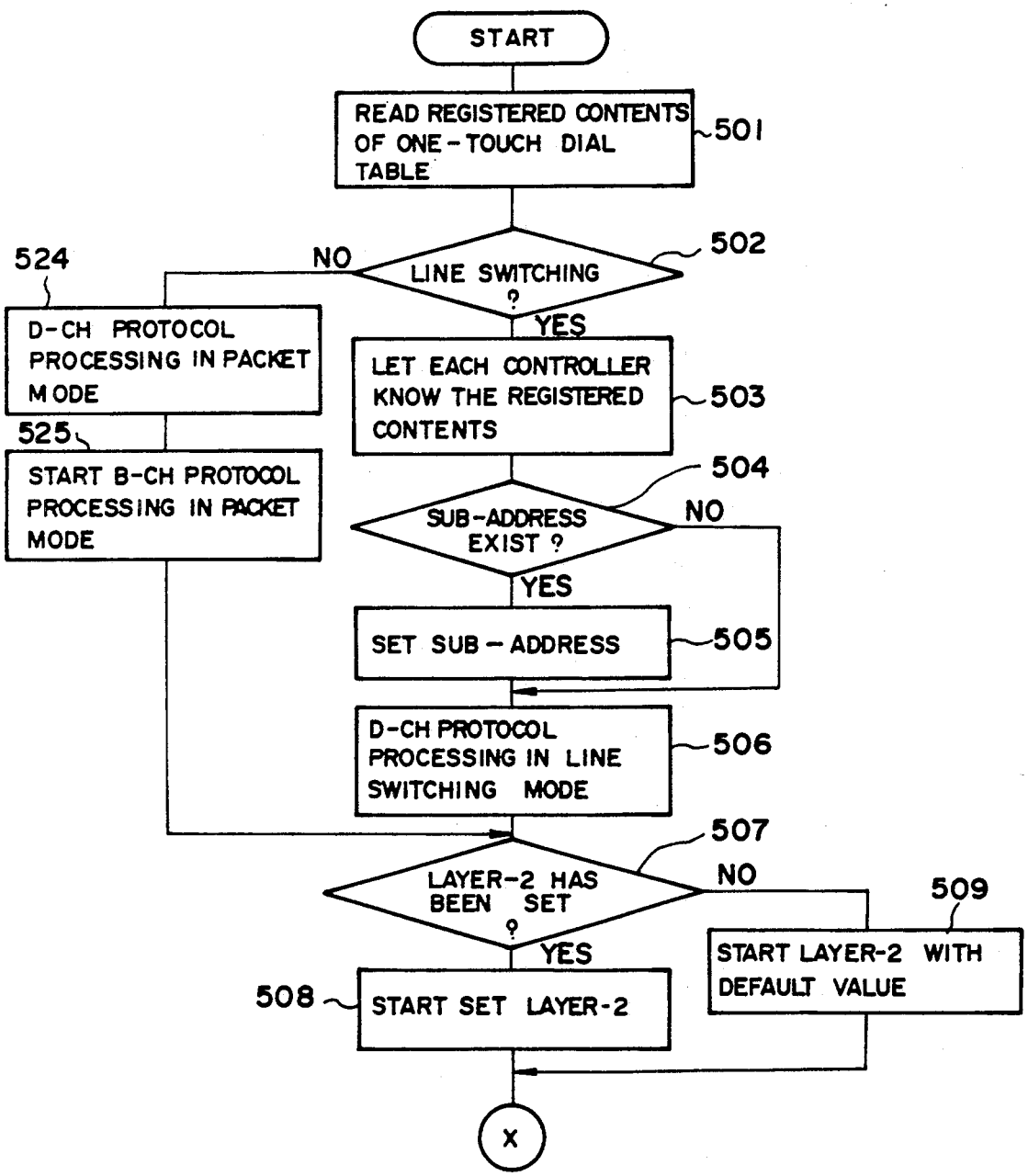

FIGS. 19A and 19B are flowcharts of a procedure for protocol discrimination which is executed in the group-4 facsimile machine when setting up a call. Referring to FIG. 19A, the operator operates desired one of the one-touch dial keys on the console/display device 40 and inputs an instruction which starts image information transmission. The system controller 34 reads information related to the operated one-touch dial key from the one-touch dial table stored in the parameter memory 35 (step 501). Then the system controller 34 determines whether information indicative of line switching is set in the exchange system information read out of the one-touch dial table (step 502).

When the result in step 502 is YES, the system controller 34 transfers the contents of the one-touch dial table to the corresponding transmission controllers 31, 32 and 33 (step 503). When valid information is set in the sub-address information, or the result in step 504 is YES, the system controller 34 lets the D-channel transmission controller 2 know the content of the sub-address information (step 505). Then, the D-channel transmission controller 2 executes the D-channel protocol procedure in the line switching mode (step 506). Thereby, the D-channel protocol between the group-4 facsimile machine of concern and the ISDN and the D-channel protocol between the other terminal and the ISDN are executed. Thereby, a B-channel is established. When the B-channel has been established, the B-channel layer-2 transmission controller 31 starts the following layer-2 transmission control procedure.

At this time, when the B-channel layer-2 transmission controller 31 has information on transmission mode to be used, or in other words, when the result in step 507 is YES, the B-channel layer-2 transmission controller 31 starts the layer-2 transmission control procedure in the mode which has been set therein (step 508). Alternatively, when the result in step 507 is NO, the B-channel layer-2 controller 31 starts the layer-2 transmission control procedure in the mode which is set beforehand as a transmission mode in default (step 509).

The B-channel layer-2 transmission controller 31 lets the system controller 34 know the result of whether the transmission mode being used coincides with that of the other terminal. When the result shows that the system controller 34 sets another transmission mode in the B-channel layer-2 transmission controller 31 in the aforementioned manner, and carries out the layer-2 transmission procedure again. When the transmission mode which is first set coincides with the transmission mode available in the other terminal (when the result in step 510 is YES), or when another transmission mode coincides with the transmission mode available in the other terminal (when the result in step 511 is YES), the B-channel layer-2 transmission controller 31 stores information on transmission mode used at that time (step 512). Thereby the B-channel layer-2 transmission controller 31 suitably executes the layer-2 transmission control procedure with the other terminal.

Then, the transmission procedure related to the layer 3 is started by the B-channel layer-3 transmission controller 32. When information on transmission mode to be used has been set in the B-channel layer-3 transmission controller 32, the B-channel layer-3 transmission controller 32 starts the layer-3 transmission control procedure in the mode being set (step 514). Alternatively, when information on transmission mode has not been set in the B-channel layer-3 transmission controller 32, that is, when the result in step 513 is NO, the B-channel transmission controller 32 starts the layer-3 transmission procedure in the predetermined default mode (step 515).

The B-channel layer-3 transmission controller 32 informs the system controller 34 of the result of whether the transmission mode being used coincides with the transmission mode of the other terminal. When the transmission mode related to the layer 3 which is first set coincides with the transmission mode available in the other terminal so that the result in step 516 is YES, the B-channel layer-3 transmission controller 32 stores, as a transmission mode in the layer 3, the transmission mode used at that time (step 517). Then the system controller 34 compares transmission mode information related to the layers 2 and 3 stored in steps 512 and 517 with the contents of the one-touch dial table. When there is some information on which no coincidence is obtained, the information is replaced by transmission mode information stored in steps 512 and 517 (step 518). Thereby, the B-channel layer-3 transmission controller 31 suitably executes the layer-3 transmission procedure with the other terminal.

When the transmission mode in the calling terminal does not coincide with that in the called terminal and therefore the result in step 516 is NO, the called terminal rejects the call and data transmission is ended. Therefore, each of the transmission controllers clears call connection (step 519). Then information about the layer-3 protocol which has been registered in the one-touch dial table related to the destination of concern is renewed with another information (step 520). Then a calling is made active again (step 521), and the procedure is terminated.

When the result in step 511 is NO and therefore the calling terminal fails to select the layer-2 transmission mode available in the called terminal, each of the transmission controllers 31 to 33 clears call connection (step 522). Then the system controller 34 has the console/display device 40 display a "communication inactive" message which represents that it cannot communicate with the designated destination terminal. At the same time, the system controller 34 has the plotter 37 output a report showing the communication inactive message (step 523).

When the content of the exchange system registered in the one-touch dial table indicates packet exchange (when the result in step 502 is NO), the system controller 34 has the D-channel transmission controller 2 execute the D-channel protocol procedure in the packet mode (step 524). Then the system controller 34 activates, in the packet mode, the B-channel layer-2 transmission controller 31, the B-channel layer-3 transmission controller 32, and the B-channel high-order layer transmission controller 33 (step 525). Then the procedure proceeds to step 507.

As described above, when setting a call, the transmission modes related to the B-channel layer 2 and the B-channel layer 3 to be used are set based on the registered contents of the one-touch dial table. Thus, it is possible to exchange image information with all group-4 facsimile machines.

When the transmission mode which is first set in the layer 2 or the layer 3 does not coincide with that in the other terminal, the calling terminal changes its own transmission mode so as to coincide with the transmission mode of the other terminal, and renews the registered contents of the one-touch dial table with information on the changed transmission mode. Thus, even when the type of destination terminal is changed, it is possible to suitably communicate with the changed destination terminal after the contents of the one-touch dial table are renewed.

FIGS. 20A and 20B are flowcharts of a protocol discrimination procedure which is executed in the group-4 facsimile machine when receiving a call. Referring to FIG. 20A, when the call set-up message SETUP sent from the ISDN is received, the system controller 34 analyzes the content of the received call set-up message (step 601). Then the system controller 34 determines whether the requested exchange system relates to the line switching mode (step 602). When the result in step 602 is YES, the system controller 34 determines whether information on the other terminal has been registered in the one-touch dial table by referring to information on source number and source sub-address contained in the received call set-up message SETUP (step 603).

When the result in step 603 is YES, the system controller 34 sets the registered contents in the corresponding transmission controllers 31 to 33 (step 604). On the other hand, when the result in step 603 is NO, the transmission mode to be set in default is set in each of the transmission controllers 31 to 33 (step 605). Then the system controller 34 has the D-channel transmission controller 2 execute the D-channel protocol procedure in the line switching mode (step 606).

Next, the B-channel layer-2 transmission controller 31 starts the transmission procedure for the layer 2 in the transmission mode which has been set (step 607). The B-channel layer 2 transmission controller 31 informs the system controller 34 of the result of whether the transmission mode being used coincides with that of the other terminal When the transmission modes are mutually different, the system controller 34 sets another transmission mode in the B-channel layer-2 transmission controller 31. Then the transmission control procedure related to the layer 2 is carried out again. On the other hand, when the transmission mode related to the layer 2 which is first set coincides with the transmission mode available in the other terminal (the result in step 608 is YES), or when the transmission mode set in step 609 coincides with the transmission mode available in the other terminal (the result in step 609 is YES), the B-channel layer-2 transmission controller 31 stores information on the transmission mode used at that time as the transmission mode related to the layer 2 (step 610). Thus, the B-channel layer-2 transmission controller 31 can suitably execute the transmission procedure related to the layer 2 with the other terminal.

Next, the B-channel layer-3 transmission controller 32 starts the transmission control procedure in the transmission mode which has been set (step 611). The B-channel layer-3 transmission controller 32 informs the system controller 34 of the result of whether the transmission mode being used coincide with the transmission mode available in the other terminal. When the transmission mode in the calling terminal is not coincident with the transmission mode in the called terminal, the system controller 34 sets another transmission mode in the B-channel layer-3 transmission controller 32. Then the call set-up signal is sent again.

When the transmission mode related to the layer 3 which is first set coincides with the transmission mode available in the other terminal (when the result in step 612 is YES), and alternatively when the transmission mode set in step 613 coincides with the transmission mode available in the other terminal (when the result in step 613 is YES), the B-channel layer-3 transmission controller 32 stores the transmission mode used at that time as the transmission mode related to the layer 3 of the destination terminal (step 614). Thus, the B-channel layer-3 transmission controller 32 can suitably execute the transmission control procedure related to the layer 3.

When the system controller 34 determines whether information on the destination terminal of concern has been stored in the one-touch dial table (step 615). When the result in step 615 is YES, the contents of the one-touch dial table are renewed with the contents of the transmission mode used at that time (step 616). On the other hand, when the result in step 615 is NO, the system controller 34 forms a report about communication with not-registered destination through the plotter 37 (step 617). This report includes a list of the contents of the one-touch dial table.

When the called terminal cannot select the transmission mode related to the layer 2 or 3 which is the same as the transmission mode available in the called terminal, or in other words, when the result in step 609 or 613 is NO, the system controller 43 stops each of the transmission controllers 31 to 33 (step 618). When information on the other terminal has been registered in the one-touch dial table (the result in step 609 is YES), the system controller 34 has the console/display device 40 display a communication inactive message which shows that it is impossible to communicate with the calling terminal of concern (step 620). Further, the system controller 34 has the plotter 37 print a report showing that it is impossible to communicate with the calling terminal of concern (step 620). When the result in step 619 is NO, the set-up call is ignored (step 621).

When the content of the exchange system information registered in the one-touch dial table indicates packet exchange (when the result in step 602 is NO), the system controller 34 has the D-channel transmission controller 2 execute the D-channel protocol procedure in the packet mode (step 622). When the B-channel is established by the execution of step 622, the system controller 34 activates, in the packet mode, the B-channel layer-2 transmission controller 31, the B-channel layer-3 transmission controller 32 and the high-order layer transmission controller 33 (step 623). When information on the other terminal has been registered in the one-touch dial table (the result in step 624 is YES), the registered contents are stored in the corresponding transmission controllers (step 625). On the other hand, when the result in step 624 is NO, the transmission mode to be set in default is set in each of the transmission controllers 31 to 33 (step 626). The procedure proceeds to step 607.

As describe above, when receiving a call, if information on the other terminal has been registered in the one-touch dial table, the call-in procedure is started in the registered transmission mode. Thus, it is possible to exchange image information with all group-4 facsimile machines.

Alternatively, when information on the other terminal has not been registered in the one-touch dial table, information on the transmission mode used at that time is printed as a report. Thus, it is convenient for the operator to register information on new terminal in the one-touch dial table.

In the aforementioned manner, according to the fourth embodiment, since the B-channel transmission mode to be used is selected by referring to information registered in the one-touch dial table, it is possible to perform data transmission in conformity to the transmission mode of the other terminal. Thus, it is possible to exchange image with all group-4 facsimile machines.

When the transmission mode which is actually used is different from the registered contents of the one-touch dial table, the registered contents are renewed with new information on the actually used transmission mode. Thus, even if the type of group-4 facsimile machine related to an ISDN address is changed, the same transmission mode can be used in the second and subsequent transmission procedure.

In the fourth embodiment, the transmission modes related to the layer 2 and layer 3 are registered in the one-touch dial table. It is particularly noted that the fourth embodiment has a protocol learning function whereby necessary information is registered in the one-touch dial table.

Transmission modes related to higher-order layers may be registered through the one-touch dial table. The present invention is not limited to facsimile machines such as group-4 facsimile machines, and includes another data terminal equipment.

The present invention is not limited to the aforementioned embodiments, and variations and modifications may be made without departing from the scope of the present invention.

What is claimed is:

1. A data terminal equipment which is coupled to an integrated services digital network through an access line and uses a hierarchical protocol in conformity to an OSI reference standard model, comprising:
   first data link protocol means for providing a link access procedure balanced (LAPB) modulo-8 data link protocol;
   second data link protocol means for providing an LAPB modulo-128 data link protocol;
   third data link protocol means for providing a link access procedure for a data channel (LAPD) data link protocol;
   protocol determining means for determining a data link protocol to be used by referring to an address field and a control field of a call set-up signal which is supplied from a second data terminal equipment; and
   data link protocol activating means, coupled to said first, second and third means and
   said protocol determining means, for selecting and activating one of said first, second and third means on the basis of the result provided by said protocol determining means.

2. A data terminal equipment as claimed in claim 1, wherein said determined data link protocol relates to a data link layer of the hierarchical protocol.

3. A data terminal equipment as claimed in claim 1, wherein said protocol determining means determines the data link protocol to be activated to be the LAPB modulo-8 data link protocol when the address field of said call set-up signal is 01h, where h represents a hexadecimal number and the control field thereof is 3Fh.

4. A data terminal equipment as claimed in claim 1, wherein said protocol determining means determines the data link protocol to be activated to be the LAPB modulo-128 data link protocol when the address field of said call set-up signal is 01h, where h represents a hexadecimal number and the control field thereof is 7Fh.

5. A data terminal equipment as claimed in claim 1, wherein said protocol determining means determines the data link protocol to be activated to be the LAPD data link protocol when the address field of said call set-up signal is 00h where h represents a hexadecimal number and the control field thereof is 7Fh.

6. A data transmission control method adapted to a data terminal equipment which uses a hierarchical protocol and has, as a transmission function on an information channel, a first transmission procedure in conformity to ISO standard ISO8208 and a second transmission procedure in conformity to CCITT recommendation T.70, the method comprising the steps of:
   receiving a procedure signal related to supplied from a calling terminal when an information channel related to said network layer is established, said procedure signal having a network layer header preceding procedure information on the network layer;
   extracting said network layer header from said received procedure signal;
   discriminating a transmission function on the information channel available in said calling terminal by referring to said extracted network layer header; and
   selecting one of said first and second transmission procedures from the discrimination result.

7. A data transmission control method as claimed in claim 6, wherein said selecting step selects one of said first and second transmission procedures which is the same as that of said calling terminal.

8. A data transmission control method as claimed in claim 6, wherein said discriminating step determines the transmission procedure available in said calling terminal to be the second transmission procedure when said network layer header includes 01h and 00h where h represents a hexadecimal number.

9. A data transmission control method as claimed in claim 6, wherein said discriminating step determines the transmission procedure available in said calling terminal to be the first transmission procedure when said network layer header does not include 01h and 00h (h represents a hexadecimal number.

10. A data transmission control method adapted to a data terminal equipment which uses a hierarchical protocol and has, as a transmission function on an information channel, a first transmission procedure in conformity to ISO standard ISO8208 and a second transmission procedure in conformity to CCITT recommendation T.70, wherein said data terminal equipment further has a memory which registers information on a transmission function available in each of other terminals, the method comprising the steps of:
  determining whether information on a destination terminal with which said data terminal equipment serving as a calling terminal wants to communicate has been registered in said memory;
  reading out said information related to said destination terminal stored in said memory when it is found that information on said destination terminal has been registered;
  determining whether said read-out information shows the first transmission procedure in conformity to the ISO standard ISO8208 or the second transmission procedure in conformity to the CCITT recommendation T.70;
  selecting one of said first and second transmission procedures so as to coincide with that of the destination terminal on the basis of the determined result; and
  setting up a call to said destination terminal on the basis of the selected one of the first and second transmission procedures.

11. A data transmission control method as claimed in claim 10, further comprising the step of: registering information with respect to said destination terminal in said memory only when no information on said destination terminal has not ben previously registered in said memory.

12. A data transmission control method as claimed in claim 10, further comprising the steps of:
  discerning whether said set-up call is rejected by said destination terminal;
  replacing said information on the transmission procedure related to said destination terminal with information showing an alternative transmission procedure when said set-up call is rejected;
  selecting one of said first and second transmission procedures so as to coincide with said alternative transmission procedure; and
  setting up a call again to said destination terminal on the basis of the selected one of the first and second transmission procedures which coincides with said alternative transmission procedure.

13. A data transmission control method as claimed in claim 10, wherein said information registered in said memory is comprised of at least a destination address and a transmission procedure which is available at said destination address.

14. A data terminal control method as claimed in claim 12, wherein when said set-up call is rejected by the occurrence of a fault, said replacing step is not performed.

15. A data terminal equipment which is coupled to an integrated services digital network through an access line and uses a hierarchical protocol in conformity to an OSI reference standard model, comprising:
  protocol control means for providing a plurality of protocols for a data link layer and a network layer of said hierarchical protocol;
  protocol storage means for storing information on a protocol which is related to each of said data link layer and said network layer and which is available in a second data terminal equipment with which said data terminal equipment wants to communicate;
  protocol learning means for discriminating a transmission procedure in said second data terminal equipment for each of said data link layer and said network layer by referring to a procedure signal transferred between said data terminal equipment and said second data terminal equipment at the time of setting up a call and for storing said discriminated transmission procedure in said protocol storage means; and
  protocol setting means for setting one of said plurality of protocols for at least each of said data link layer and said network layer in said protocol control means by referring to said information stored in said protocol storage means.

16. A data terminal equipment as claimed in claim 15, wherein said protocol setting means sets one of said plurality of protocols for each of said data link layer and said network layer in said protocol control means by referring to said discriminated transmission procedure provided by said protocol learning means in addition to said information stored in said protocol storage means.

17. A data terminal equipment as claimed in claim 15, wherein said protocol control means provides, for the data link layer, a link access procedure balanced known as a LAPB modulo-8 data link protocol, an LAPB modulo-128 data link protocol, and a link access procedure for a data channel (LAPD) data link protocol.

18. A data terminal equipment as claimed in claim 15, wherein said protocol control means provides, for the network layer, a first protocol in conformity to the ISO standard ISO8208, and a second protocol in conformity to the CCITT recommendation T.70.

19. A data terminal equipment as claimed in claim 15, wherein when said protocol setting means finds no information related to each of said data link layer and said network layer for said second data terminal equipment in said protocol storage means, said protocol setting means sets a predetermined protocol for each of said data link layer and said network layer.

20. A data terminal equipment as claimed in claim 15, wherein said protocol learning means comprises means for discerning whether one of said protocols set through said protocol setting means for each of said data link layer and said network layer coincides with the protocol available in said second data terminal equipment for each of said data link layer and said network layer.

* * * * *